(12) United States Patent
Watanabe

(10) Patent No.: US 11,089,211 B2
(45) Date of Patent: Aug. 10, 2021

(54) IMAGE PROCESSING APPARATUS, IMAGE PROCESSING METHOD, AND PROGRAM FOR SWITCHING BETWEEN TWO TYPES OF COMPOSITE IMAGES

(71) Applicant: SONY SEMICONDUCTOR SOLUTIONS CORPORATION, Kanagawa (JP)

(72) Inventor: Goshi Watanabe, Saitama (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/962,451

(22) PCT Filed: Jan. 10, 2019

(86) PCT No.: PCT/JP2019/000562
§ 371 (c)(1),
(2) Date: Jul. 15, 2020

(87) PCT Pub. No.: WO2019/146418
PCT Pub. Date: Aug. 1, 2019

(65) Prior Publication Data
US 2021/0067689 A1    Mar. 4, 2021

(30) Foreign Application Priority Data
Jan. 25, 2018   (JP) .............................. JP2018-010641

(51) Int. Cl.
*H04N 5/232* (2006.01)
*H04N 9/04* (2006.01)
*H04N 5/225* (2006.01)

(52) U.S. Cl.
CPC ....... *H04N 5/23229* (2013.01); *H04N 5/2258* (2013.01); *H04N 9/04* (2013.01)

(58) Field of Classification Search
CPC .... H04N 5/23229; H04N 5/2258; H04N 9/04; H04N 9/093; H04N 13/0235; H04N 13/0239; G06T 5/50
See application file for complete search history.

(56) References Cited

U.S. PATENT DOCUMENTS 3,736,372 A *  5/1973  Vanderwel ............... H04N 9/43
                                                         348/34
2002/0060743 A1*  5/2002  Hori ....................... H04N 5/349
                                                         348/280

(Continued)

FOREIGN PATENT DOCUMENTS

JP  2013-183353 A   9/2013
JP  2015-001977 A   1/2015

(Continued)

OTHER PUBLICATIONS

International Search Report and Written Opinion of PCT Application No. PCT/JP2019/000562, dated Mar. 26, 2019, 08 pages of ISRWO.

*Primary Examiner* — Hung H Lam
(74) *Attorney, Agent, or Firm* — Chip Law Group

(57) ABSTRACT

There are achieved an apparatus and a method for switching a color image-based composite image and a black-and-white image-based composite image at an optimum timing such that it is difficult for an observer to notice the switching of the images. A color image and a black-and-white image captured from different viewpoints are input to generate either of the following two types of composite images of (a) a color image-based composite image in which a position of the black-and-white image is adjusted to coincide with a position of the color image and (b) a black-and-white image-based composite image in which the position of the color image is adjusted to coincide with the position of the black-and-white image, by switching between the two types (Continued)

of composite images on the basis of a predetermined reference image switching threshold. In this configuration, a hysteresis is set as the reference image switching threshold, and the hysteresis is changed according to a situation. Thus, reference images can be switched at an optimum timing such that it is difficult for an observer to notice the switching of the reference images.

18 Claims, 21 Drawing Sheets

(56) References Cited

U.S. PATENT DOCUMENTS

| | | | |
|---|---|---|---|
| 2013/0229544 A1 | 9/2013 | Bando | |
| 2014/0104432 A1* | 4/2014 | Lee | H04N 7/18 348/159 |
| 2015/0278996 A1 | 10/2015 | Tsutsumi | |
| 2018/0376063 A1* | 12/2018 | Yu | H04N 5/2351 |

FOREIGN PATENT DOCUMENTS

| | | |
|---|---|---|
| JP | 2015-197745 A | 11/2015 |
| WO | 2017/208536 A1 | 12/2017 |
| WO | 2018/016150 A1 | 1/2018 |
| WO | 2018/016151 A1 | 1/2018 |

* cited by examiner

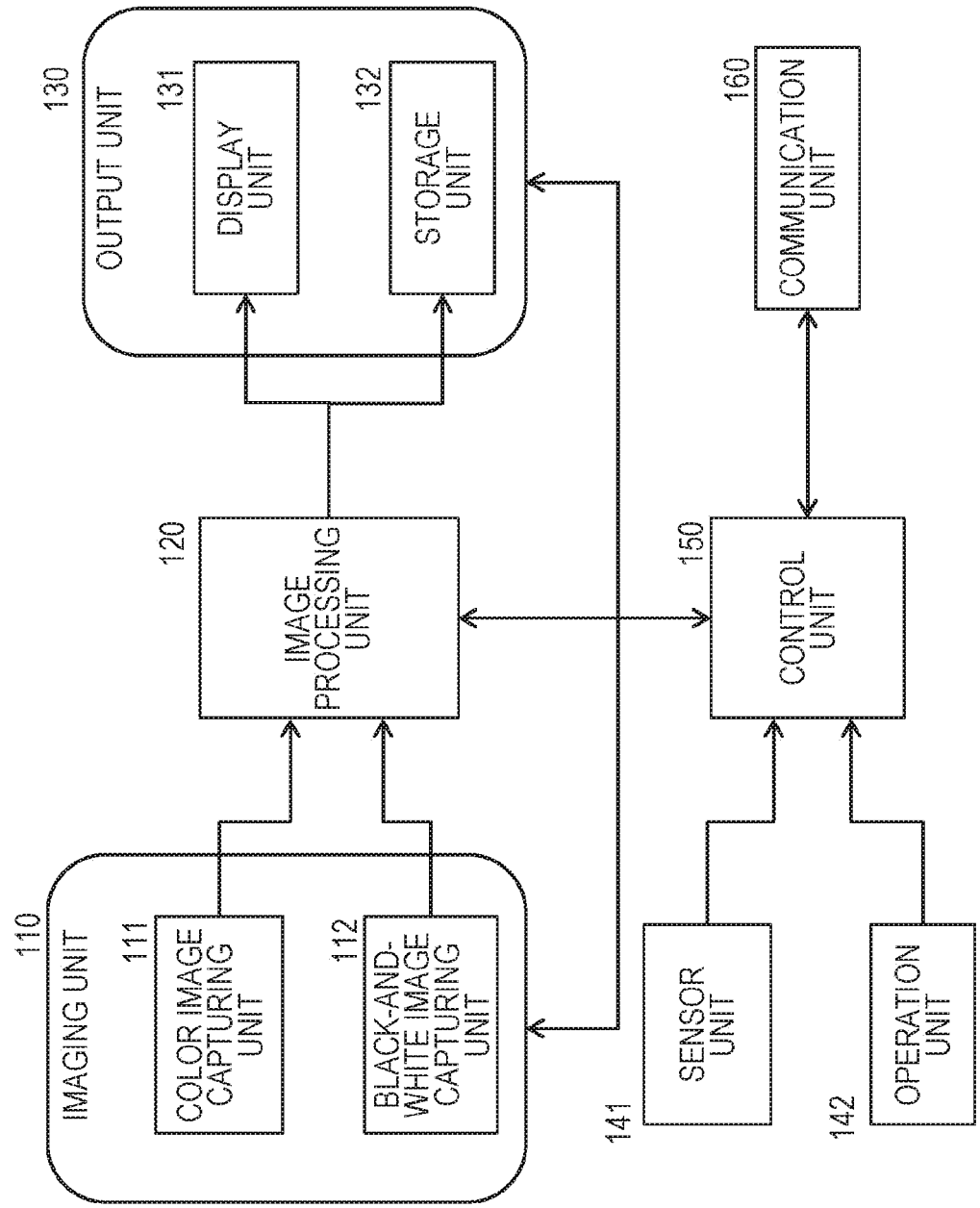

FIG. 3B

| G | B | G | B |
|---|---|---|---|
| R | G | R | G |
| G | B | G | B |
| R | G | R | G |

FIG. 3A

| W | W | W | W |
|---|---|---|---|
| W | W | W | W |
| W | W | W | W |
| W | W | W | W |

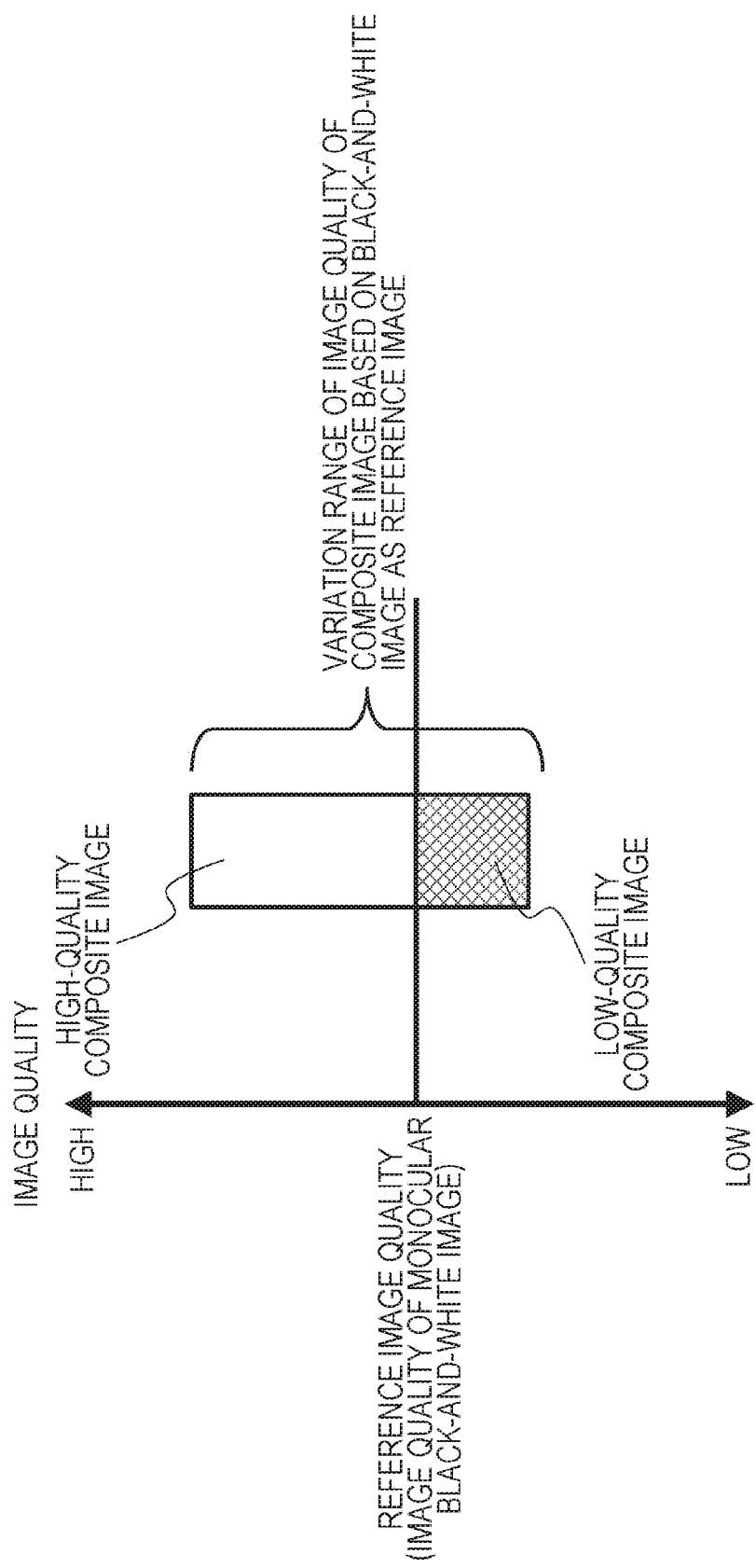

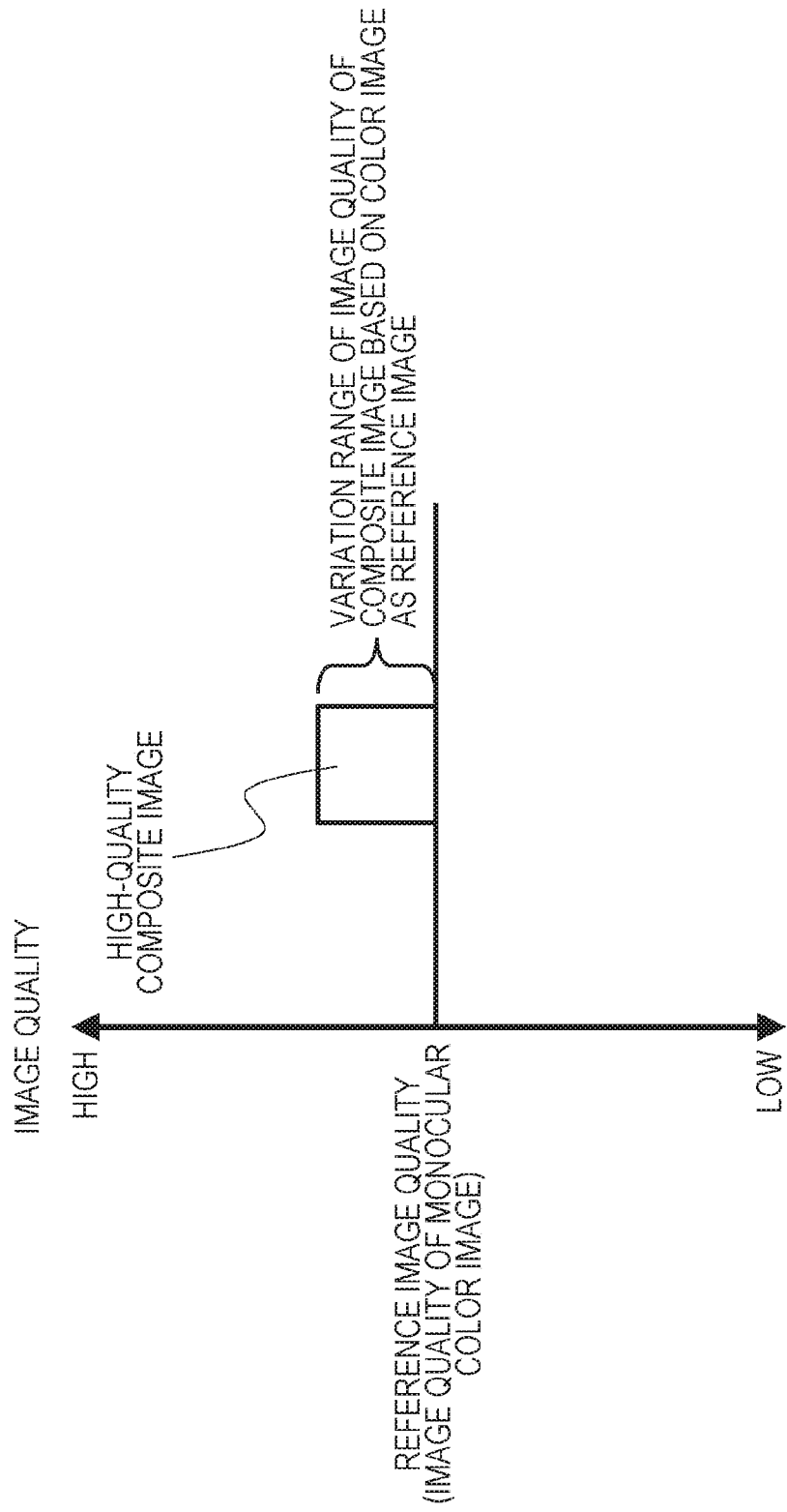

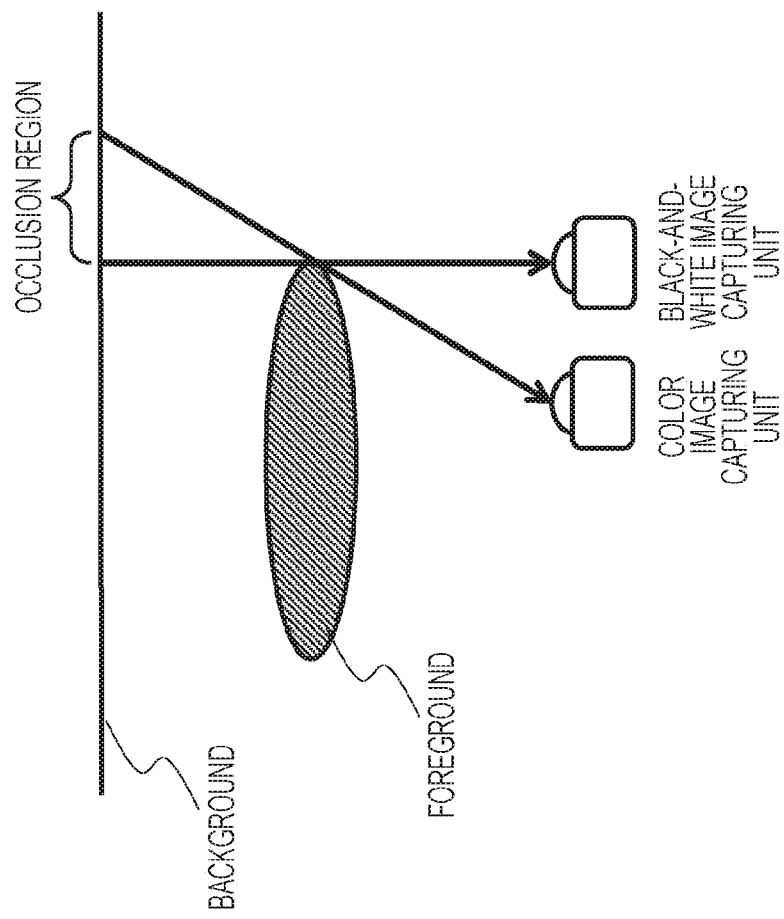

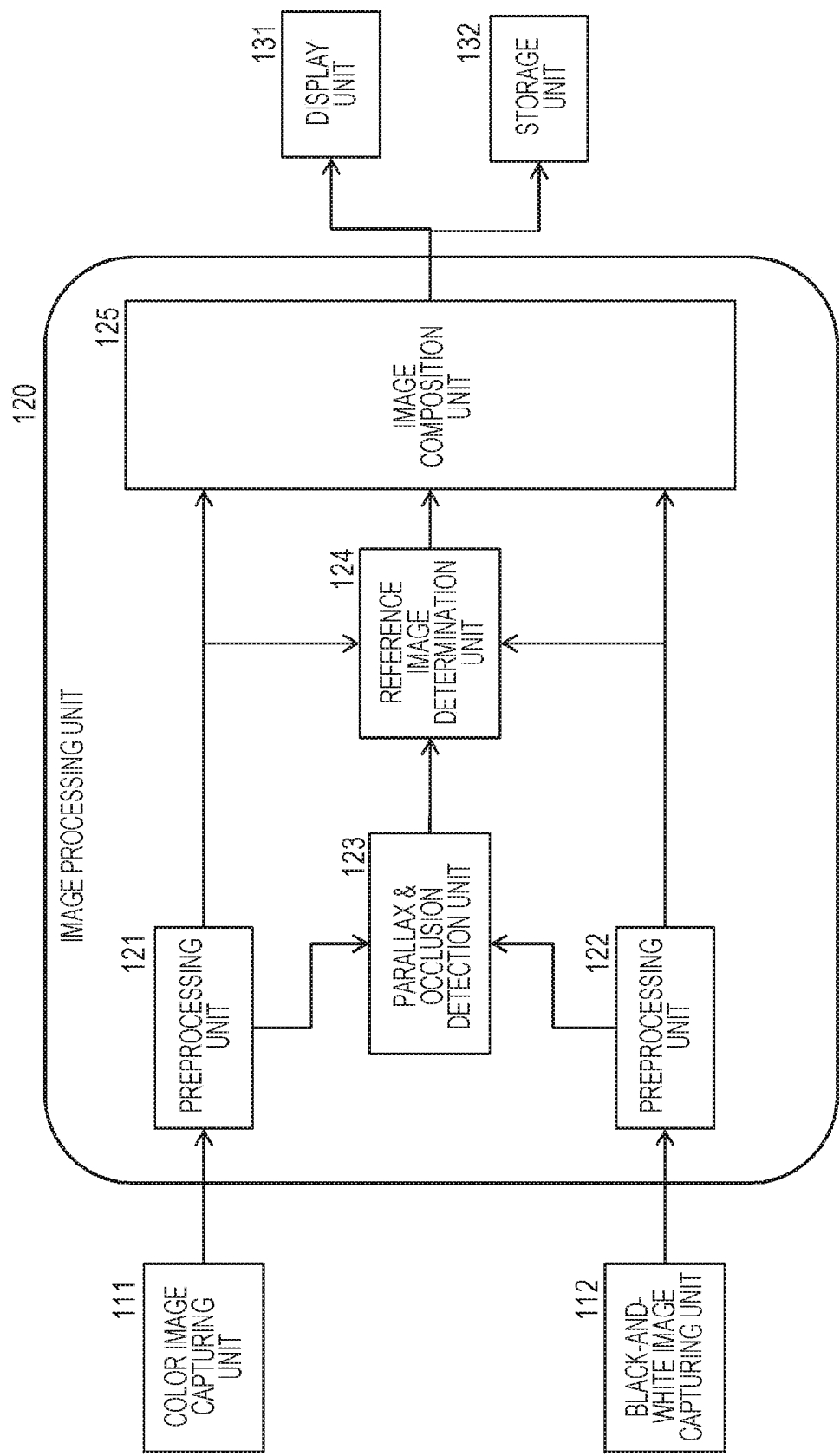

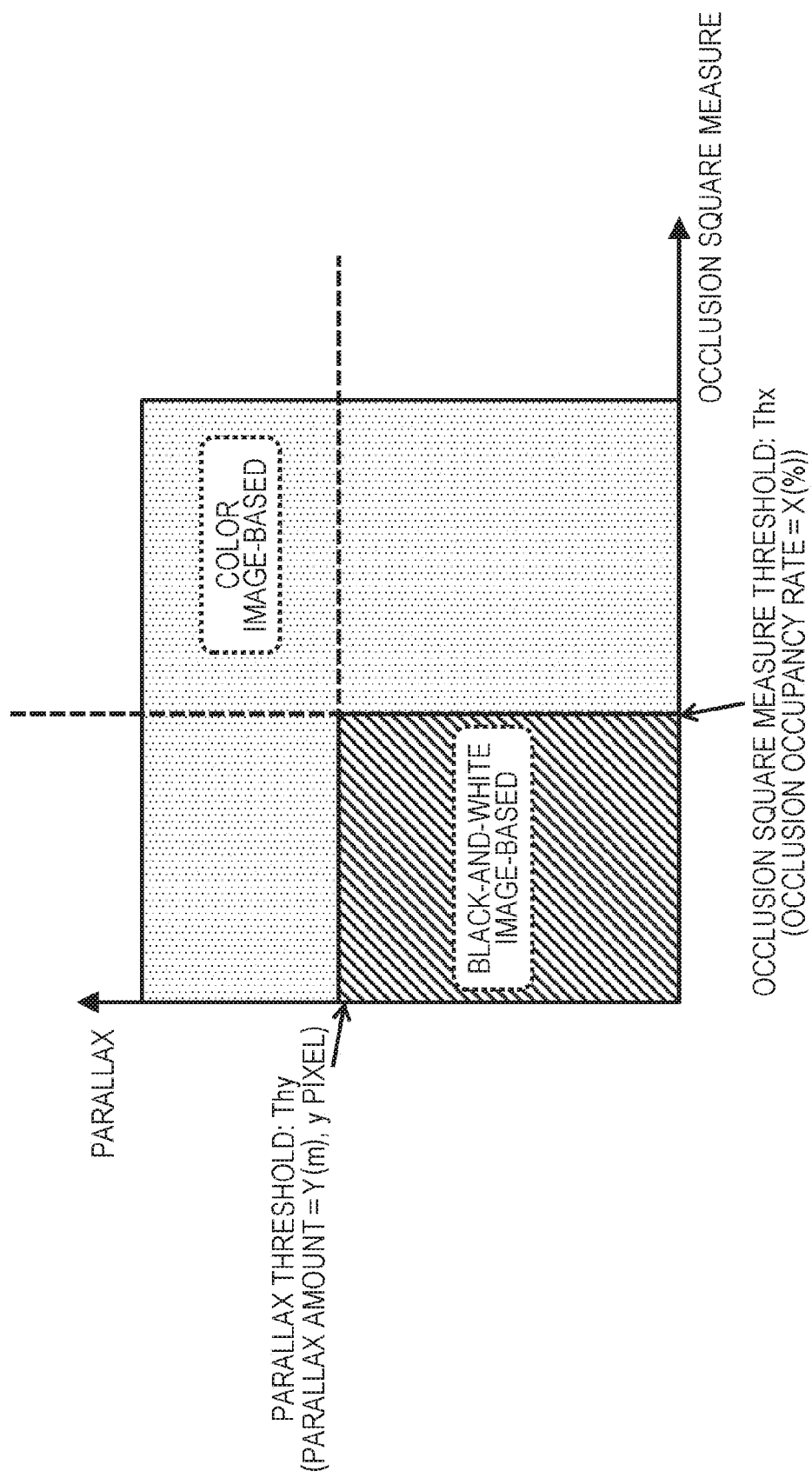

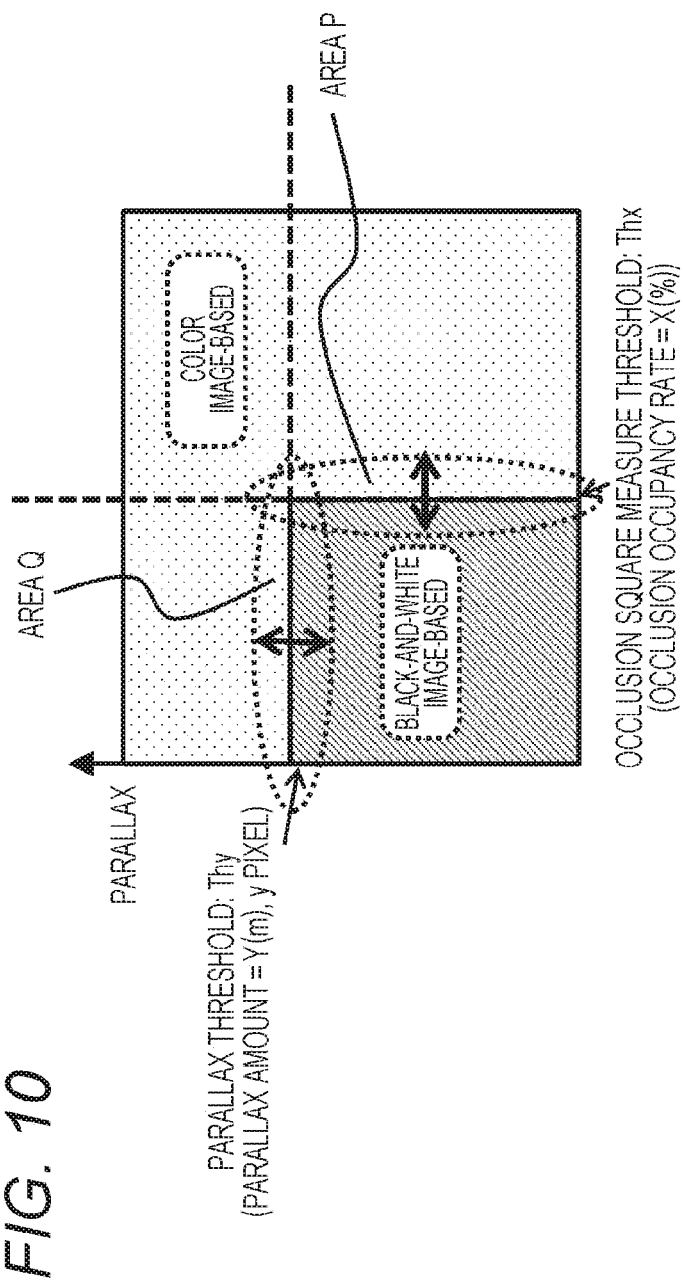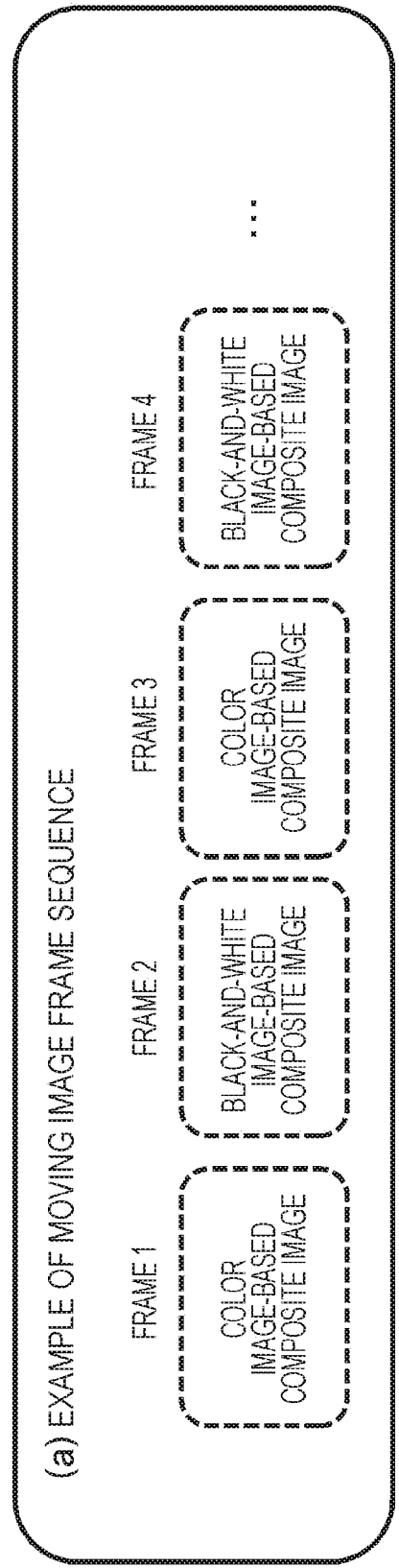
FIG. 10
(a) EXAMPLE OF MOVING IMAGE FRAME SEQUENCE

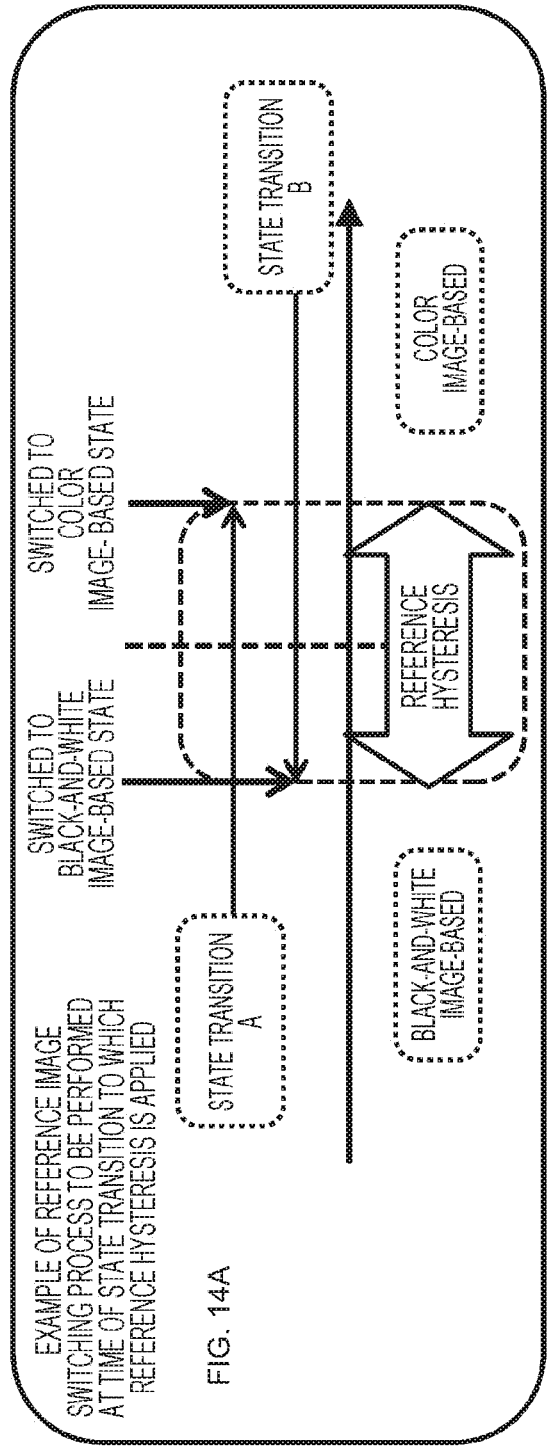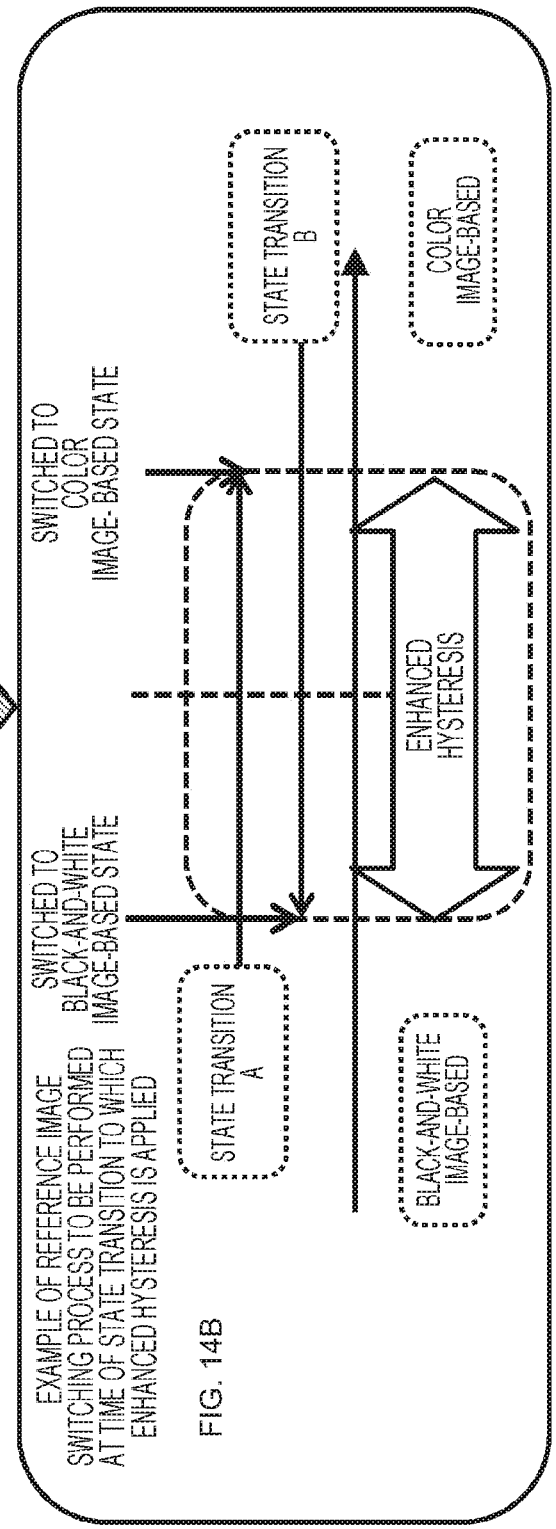

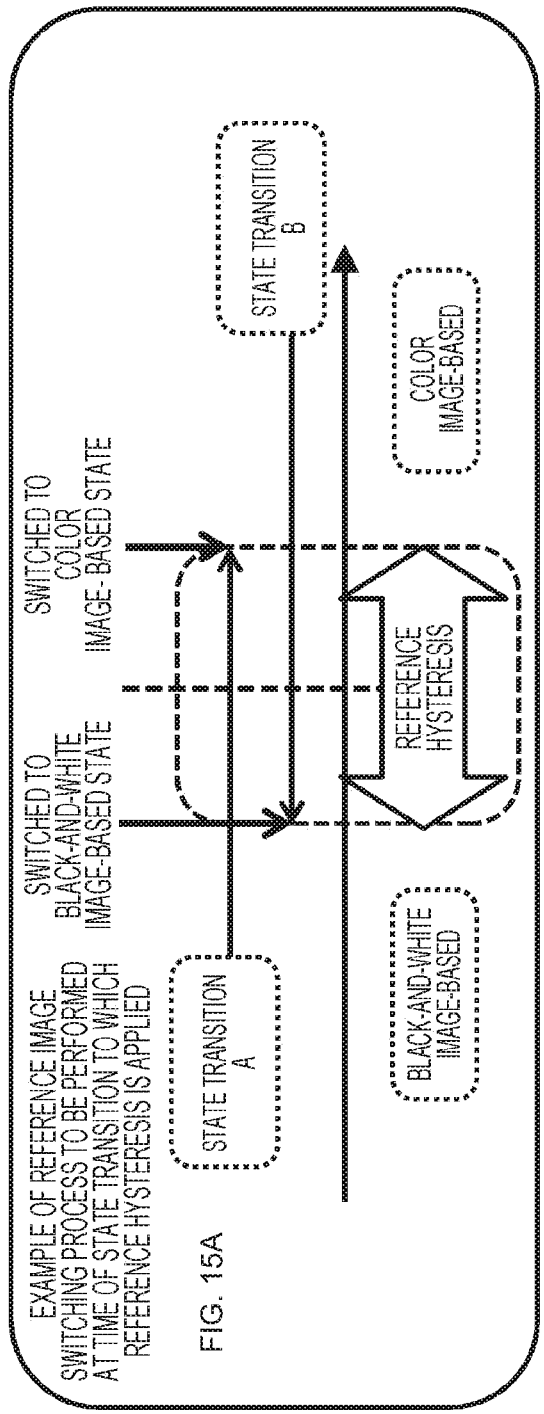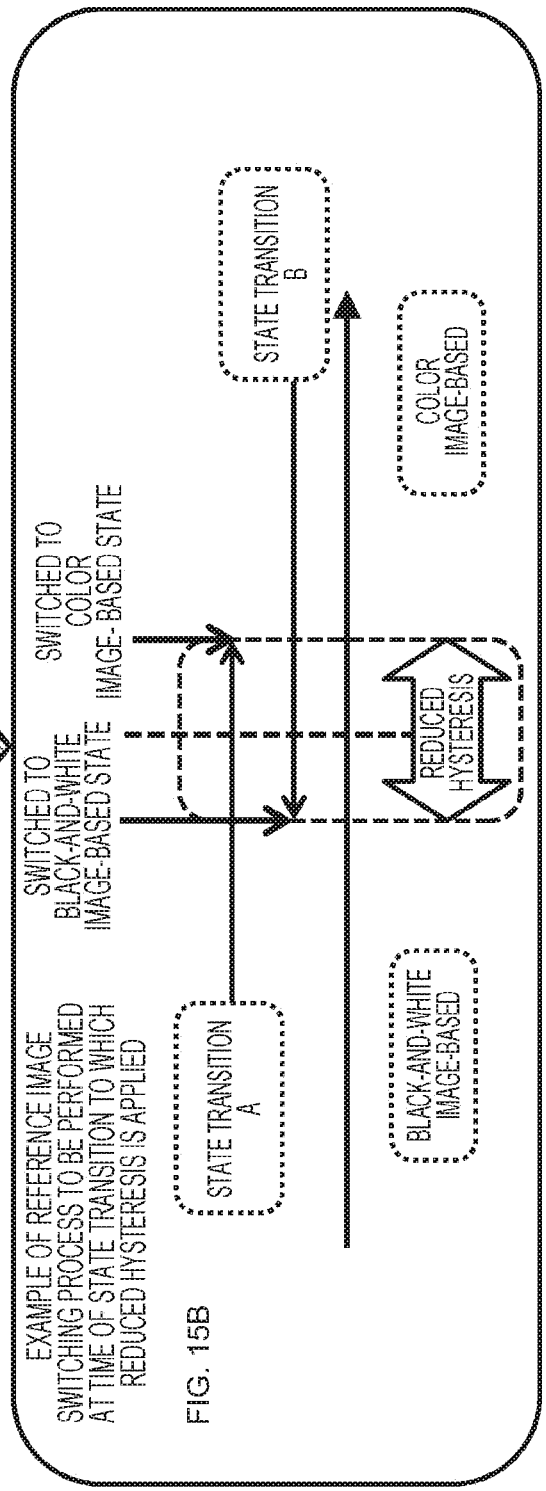

FIG. 20

| | (A) HYSTERESIS CONTROL PARAMETER | (B) ACQUIRED VALUE | (C) THRESHOLD | (D) HYSTERESIS ADJUSTMENT VALUE CALCULATION MODE |
|---|---|---|---|---|
| (1) | INTRA-SCREEN MOTION VECTOR QUANTITY | a | Tha | WHEN a > Tha, HYSTERESIS AMOUNT IS REDUCED |
| (2) | CAMERA MOTION QUANTITY | b | Thb | WHEN b > Thb, HYSTERESIS AMOUNT IS REDUCED |
| (3) | ZOOM CHANGE RATE | c | Thc | WHEN c > Thc, HYSTERESIS AMOUNT IS REDUCED |
| (4) | ILLUMINANCE CHANGE RATE | d | Thd | WHEN d > Thd, HYSTERESIS AMOUNT IS REDUCED |
| (5) | ISO SENSITIVITY CHANGE RATE | e | The | WHEN e > The, HYSTERESIS AMOUNT IS REDUCED |
| (6) | SCENE CHANGE INDEX VALUE | f | Thf | WHEN f > Thf, HYSTERESIS AMOUNT IS REDUCED |
| (7) | WHITE BALANCE CHANGE RATE | g | Thg | WHEN g > Thg, HYSTERESIS AMOUNT IS INCREASED |
| (8) | INTRA-IMAGE FACE AREA OCCUPANCY RATE | h | Thh | WHEN h > Thh, HYSTERESIS AMOUNT IS REDUCED |
| (9) | REFERENCE IMAGE CHANGE REDUCTION MODE SETTING VALUE (ON/OFF) | i = ON /OFF | ON/ OFF | WHEN i = ON, HYSTERESIS AMOUNT IS REDUCED |

FIG. 21

| | (P) PARAMETER TO BE SET BY USER | (Q) SETTING EXAMPLE |
|---|---|---|
| (1) | REFERENCE THRESHOLD | CHANGE OCCLUSION SQUARE MEASURE THRESHOLD Thx OR PARALLAX THRESHOLD Thy |
| (2) | REFERENCE HYSTERESIS | CHANGE REFERENCE HYSTERESIS SET AS DEFAULT |
| (3) | HYSTERESIS ADJUSTMENT VALUE CORRESPONDING TO EACH HYSTERESIS CONTROL PARAMETER | CHANGE HYSTERESIS ADJUSTMENT VALUES A, B, C, ... CORRESPONDING TO RESPECTIVE HYSTERESIS CONTROL PARAMETERS |
| (4) | THRESHOLD CORRESPONDING TO EACH HYSTERESIS CONTROL PARAMETER | CHANGE THRESHOLDS Tha, Thb, ... CORRESPONDING TO RESPECTIVE HYSTERESIS CONTROL PARAMETERS |
| (5) | APPLICATION RANGE CORRESPONDING TO EACH HYSTERESIS CONTROL PARAMETER | CHANGE, FOR EXAMPLE, RANGE OF DETECTING INTRA-IMAGE MOTION VECTOR (ENTIRE SCREEN/FOCUSED ON CENTER/PRIORITY GIVEN TO TARGET SUBJECT, OR THE LIKE) |

IMAGE PROCESSING APPARATUS, IMAGE PROCESSING METHOD, AND PROGRAM FOR SWITCHING BETWEEN TWO TYPES OF COMPOSITE IMAGES

CROSS REFERENCE TO RELATED APPLICATIONS

This application is a U.S. National Phase of International Patent Application No. PCT/JP2019/000562 filed on Jan. 10, 2019, which claims priority benefit of Japanese Patent Application No. JP 2018-010641 filed in the Japan Patent Office on Jan. 25, 2018. Each of the above-referenced applications is hereby incorporated herein by reference in its entirety.

TECHNICAL FIELD

The present disclosure relates to an image processing apparatus, an image processing method, and a program. More specifically, the present disclosure relates to an image processing apparatus, an image processing method, and a program for combining two images captured by a plurality of imaging units to generate a high-quality image.

BACKGROUND ART

It is known that multiple images having different image qualities are combined to generate a high-quality image.

For example, Patent Document 1 (Japanese Patent Application Laid-Open No. 2015-197745) discloses a configuration in which a color image and a black-and-white image are combined to generate a high-quality image by use of color information of the color image and brightness information of the black-and-white image.

CITATION LIST

Patent Document

Patent Document 1: Japanese Patent Application Laid-Open No. 2015-197745

SUMMARY OF THE INVENTION

Problems to be Solved by the Invention

Patent Document 1 described above discloses a configuration in which a color image and a black-and-white image are combined to generate a high-quality image.

However, the composite image generation process described in Patent Document 1 is not based on a configuration in which image composition is performed with either a color image or a black-and-white image set as a reference image according to an imaging situation.

In contrast, for example, either a color image or a black-and-white image is used as a reference image (main image) to generate a composite image in a process of the present disclosure so that a composite image which is higher in image quality is generated according to an imaging situation. However, with such a configuration, in a case where, for example, a moving image is captured, it is necessary to switch reference images according to a change in imaging conditions. If the images are frequently switched, a viewpoint moves on the basis of a parallax between the two images. This brings a sense of discomfort to a user observing the images.

An object of the present disclosure is to provide an image processing apparatus, an image processing method, and a program that eliminate or reduce the sense of discomfort of an image observing user by controlling the switching of two reference images.

Solutions to Problems

A first aspect of the present disclosure is an image processing apparatus including:

an image processing unit that performs a process of combining a color image and a black-and-white image captured from different viewpoints to generate a composite image, the image processing unit being configured to generate either of the following two types of composite images (a) and (b) by switching between the two types of composite images on the basis of a predetermined reference image switching threshold:

(a) a color image-based composite image in which a position of the black-and-white image is adjusted to coincide with a position of the color image, or (b) a black-and-white image-based composite image in which the position of the color image is adjusted to coincide with the position of the black-and-white image; and a reference image determination unit that performs a reference image determination process in which it is determined whether to use the color image or the black-and-white image as a reference image, the reference image determination unit being configured to set a hysteresis as the reference image switching threshold and perform control to change the hysteresis according to a situation.

Moreover, a second aspect of the present disclosure is an image processing apparatus including:

an image processing unit that performs a process of combining a first image and a second image captured from different viewpoints to generate a composite image, the image processing unit being configured to generate either of the following two types of composite images (a) and (b) by switching between the two types of composite images on the basis of a predetermined reference image switching threshold:

(a) a first image-based composite image in which a position of the second image is adjusted to coincide with a position of the first image, or (b) a second image-based composite image in which the position of the first image is adjusted to coincide with the position of the second image; and a reference image determination unit that performs a reference image determination process in which it is determined whether to use the first image or the second image as a reference image, the reference image determination unit being configured to set a hysteresis as the reference image switching threshold and perform control to change the hysteresis according to a situation.

Furthermore, a third aspect of the present disclosure is an image processing method to be performed in an image processing apparatus configured to perform a process of combining a color image and a black-and-white image captured from different viewpoints and generate either of the following two types of composite images (a) and (b) by switching between the two types of composite images on the basis of a predetermined reference image switching threshold:

(a) a color image-based composite image in which a position of the black-and-white image is adjusted to coincide with a position of the color image, or (b) a black-and-white image-based composite image in which the position of the color image is adjusted to coincide with the position of the black-and-white image, the method including:

causing a reference image determination unit of the image processing apparatus to perform a reference image determination process in which it is determined whether to use the color image or the black-and-white image as a reference image; and causing the reference image determination unit to set a hysteresis as the reference image switching threshold and perform control to change the hysteresis according to a situation.

Moreover, a fourth aspect of the present disclosure is an image processing method to be performed in an image processing apparatus configured to perform a process of combining a first image and a second image captured from different viewpoints and generate either of the following two types of composite images (a) and (b) by switching between the two types of composite images on the basis of a predetermined reference image switching threshold:

(a) a first image-based composite image in which a position of the second image is adjusted to coincide with a position of the first image, or (b) a second image-based composite image in which the position of the first image is adjusted to coincide with the position of the second image, the method including:

causing a reference image determination unit of the image processing apparatus to perform a reference image determination process in which it is determined whether to use the first image or the second image as a reference image; and causing the reference image determination unit to set a hysteresis as the reference image switching threshold and perform control to change the hysteresis according to a situation.

Furthermore, a fifth aspect of the present disclosure is a program for causing image processing to be performed in an image processing apparatus configured to perform a process of combining a color image and a black-and-white image captured from different viewpoints and generate either of the following two types of composite images (a) and (b) by switching between the two types of composite images on the basis of a predetermined reference image switching threshold:

(a) a color image-based composite image in which a position of the black-and-white image is adjusted to coincide with a position of the color image, or (b) a black-and-white image-based composite image in which the position of the color image is adjusted to coincide with the position of the black-and-white image, the program causing a reference image determination unit of the image processing apparatus to:

perform a reference image determination process in which it is determined whether to use the color image or the black-and-white image as a reference image; and set a hysteresis as the reference image switching threshold and perform control to change the hysteresis according to a situation in the reference image determination process.

Note that the program according to the present disclosure is, for example, a program that can be provided through a storage medium or a communication medium to be provided in a computer-readable form to an information processing apparatus or a computer system that can execute various program codes. As a result of providing such a program in a computer-readable form, a process corresponding to the program is implemented on the information processing apparatus or the computer system.

Still other objects, features, and advantages of the present disclosure will be apparent from more detailed descriptions based on embodiments of the present disclosure to be described later and the accompanying drawings. Note that in the present specification, the term "system" refers to a logical set configuration of a plurality of devices, and is not limited to one in which the devices of each configuration are in the same casing.

Effects of the Invention

According to the configuration of one embodiment of the present disclosure, there are achieved an apparatus and a method for switching a color image-based composite image and a black-and-white image-based composite image at an optimum timing such that it is difficult for an observer to notice the switching of the images.

Specifically, for example, a color image and a black-and-white image captured from different viewpoints are input to generate either of the following two types of composite images of (a) a color image-based composite image in which a position of the black-and-white image is adjusted to coincide with a position of the color image and (b) a black-and-white image-based composite image in which the position of the color image is adjusted to coincide with the position of the black-and-white image, by switching between the two types of composite images on the basis of a predetermined reference image switching threshold. In this configuration, a hysteresis is set as the reference image switching threshold, and the hysteresis is changed according to a situation. Thus, reference images can be switched at an optimum timing such that it is difficult for an observer to notice the switching of the reference images.

With the present configuration, there are achieved an apparatus and a method for switching a color image-based composite image and a black-and-white image-based composite image at an optimum timing such that it is difficult for an observer to notice the switching of the images.

Note that the effects described in the present specification are merely illustrative and not restrictive, and additional effects may also be achieved.

BRIEF DESCRIPTION OF DRAWINGS

FIG. 2 is a diagram illustrating a configuration example of the image processing apparatus.

FIGS. 3A and 3B are diagrams illustrating configuration examples of imaging elements.

FIG. 4 is a diagram illustrating the image quality of a black-and-white image.

FIG. 5 is a diagram illustrating the image quality of a color image.

FIG. 6 is a diagram illustrating occlusion.

FIG. 7 is a diagram illustrating a configuration example of an image processing unit.

FIG. 8 is a diagram illustrating an example of a reference image determination process.

FIG. 10 is a diagram illustrating a problem to be caused by the switching of reference images.

FIGS. 14A and 14B are diagrams illustrating the reference image switching process to which hysteresis is applied.

FIGS. 15A and 15B are diagrams illustrating the reference image switching process to which hysteresis is applied.

FIG. 20 is a diagram illustrating hysteresis control parameters.

FIG. 21 is a diagram illustrating user-settable parameters.

MODE FOR CARRYING OUT THE INVENTION

Details of an image processing apparatus, an image processing method, and a program according to the present disclosure will be described below with reference to the drawings. Note that description will be provided in accordance with the following items.

Figure 1B:
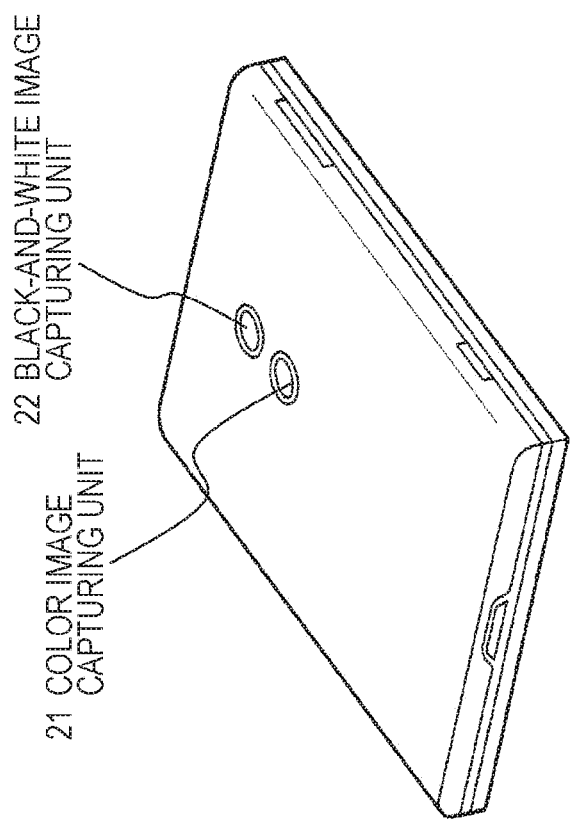
FIGS. 1A and 1B are diagrams illustrating an external configuration example of an image processing apparatus.
Figure 1A:
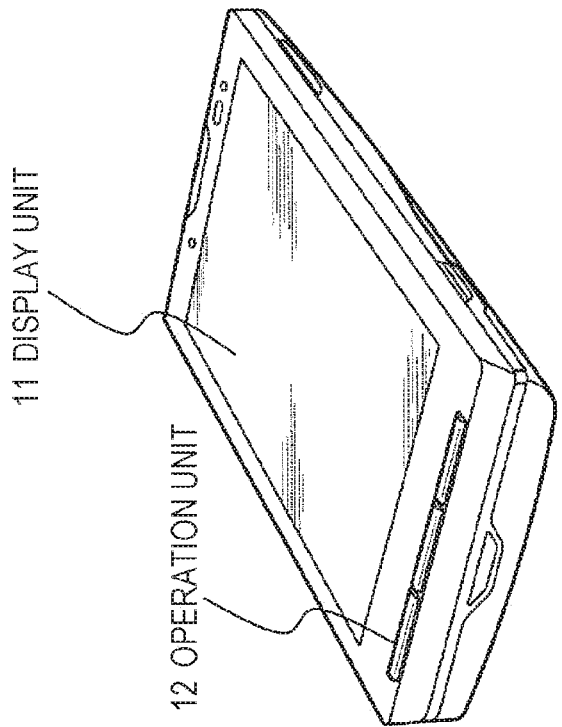

1. Regarding Configuration Example of Image Processing Apparatus
2. Regarding Composite Image Generation Process to Be Performed by Image Processing Unit
3. Regarding Reference Image Determination Process to Be Performed by Reference Image Determination Unit
4. Regarding Sequence of Processing to Be Performed by Reference Image Determination Unit
5. Regarding User-Settable Parameters
6. Regarding Other Embodiments
7. Summary of Configurations of Present Disclosure 1. Regarding Configuration Example of Image Processing Apparatus FIGS. 1A and 1B are diagrams showing a configuration example of an image processing apparatus according to the present disclosure. FIGS. 1A and 1B show an information processing terminal (smartphone) having a camera function, which is an example of the image processing apparatus according to the present disclosure.

Note that the image processing apparatus according to the present disclosure is not limited to such an information processing terminal (smartphone) and also includes, for example, an imaging apparatus such as a camera or an apparatus such as a PC that performs image processing on an image input thereto after being captured by a camera.

FIG. 1A shows the front side of an image processing apparatus 10. A display unit 11 and an operation unit 12 are provided on the front side of the image processing apparatus 10. FIG. 1B shows the back side of the image processing apparatus 10. A plurality of imaging units, that is, a color image capturing unit 21 and a black-and-white image capturing unit 22 are provided on the back side of the image processing apparatus 10.

FIG. 2 shows a configuration example of the image processing apparatus.

An image processing apparatus 100 includes a color image capturing unit 111, a black-and-white image capturing unit 112, and an image processing unit 120. The color image capturing unit 111 and the black-and-white image capturing unit 112 are included in an imaging unit 110. The image processing apparatus 100 also includes a display unit 131 and a storage unit 132 as an output unit 130 of an image processed by the image processing unit 120.

Moreover, the image processing apparatus 100 includes a sensor unit 141, an operation unit 142, a control unit 150, and a communication unit 160.

The color image capturing unit 111 and the black-and-white image capturing unit 112 are provided on the same surface side of the image processing apparatus 100 as shown in FIG. 1B. The color image capturing unit 111 and the black-and-white image capturing unit 112 each include an imaging element such as a complementary metal oxide semiconductor (CMOS) image sensor, and perform photoelectric conversion of light captured by a lens (not shown). Thus, the color image capturing unit 111 and the black-and-white image capturing unit 112 each generate image data of a captured image, and output the image data to the image processing unit 120. Furthermore, there is a difference in characteristic between the color image capturing unit 111 and the black-and-white image capturing unit 112.

FIGS. 3A and 3B show examples of pixel arrays of the imaging unit. FIG. 3A shows a pixel array of the black-and-white image capturing unit 112. All the pixels included in the black-and-white image capturing unit 112 are white (W) pixels that each output an electric signal based on the amount of incident light in the entire wavelength range of visible light. Therefore, the black-and-white image capturing unit 112 generates image data of a black-and-white image.

FIG. 3B shows a pixel array of the color image capturing unit 111. The color image capturing unit 111 includes a color filter including, for example, red (R) pixels, blue (B) pixels, and green (G) pixels arranged in a Bayer array. In the Bayer array, two green (G) pixels are diagonally located in each pixel unit of two-by-two pixels, and the rest of the pixels in each pixel unit correspond to a red (R) pixel and a blue (B) pixel. That is, the color image capturing unit 111 includes color pixels that each output an electric signal based on the amount of incident light of corresponding one of red, blue, and green color components. Therefore, the color image capturing unit 111 generates image data of a color image in which each pixel represents one of the three primary color (RGB) components.

The image processing unit 120 generates a composite image by using captured images obtained by the color image capturing unit 111 and the black-and-white image capturing unit 112. That is, the image processing unit 120 performs image processing by using the captured images obtained by the color image capturing unit 111 and the black-and-white image capturing unit 112, and generates a higher-quality composite image of the respective captured images obtained by the color image capturing unit 111 and the black-and-white image capturing unit 112. Then, the image processing unit 120 outputs the generated composite image to the display unit 131 and the storage unit 132 in the output unit 130. Note that the configuration and operation of the image processing unit 120 will be described later in detail.

The sensor unit 141 includes a gyro sensor or the like, and detects a shake generated in the image processing apparatus 100. The sensor unit 141 outputs information on the detected shake to the control unit 150.

The communication unit 160 communicates with devices on a network such as a local area network (LAN) or the Internet.

The display unit 131 displays a captured image on the basis of image data supplied from the image processing unit 120, and also displays a menu screen, various application screens, and the like on the basis of an information signal from the control unit 150. Note that the display surface of the display unit 131 is configured as a touch panel such that a GUI function can be used.

The operation unit 142 includes operation switches and the like. The operation unit 142 generates an operation signal according to a user operation, and outputs the operation signal to the control unit 150.

The storage unit 132 stores information generated by the image processing apparatus 100, such as image data supplied from the image processing unit 120, and various types of information to be used for executing communication and applications in the image processing apparatus 100.

The control unit 150 includes a central processing unit (CPU), a read only memory (ROM), a random access memory (RAM) (not shown), and the like. The control unit 150 executes a program stored in the ROM or the RAM to control the operation of each unit such that operation is performed in the image processing apparatus 100 according to a user operation performed on the touch panel included in the display unit 131 or on the operation unit 142.

Note that the image processing apparatus 100 is not limited to an apparatus with the configuration shown in FIG. 2, and may also include, for example, an encoding processing unit for encoding image data and storing the encoded image data in the storage unit 132, a resolution conversion unit that adjusts the image data to the resolution of the display unit, and the like.

2. Regarding Composite Image Generation Process to Be Performed by Image Processing Unit Next, described below is a composite image generation process to be performed by the image processing unit 120.

The image processing unit 120 shown in FIG. 2 performs an image composition process by using a black-and-white image obtained by the black-and-white image capturing unit 112 and a color image obtained by the color image capturing unit 111.

FIG. 4 is a diagram for illustrating image quality to be achieved by an image composition process in which a black-and-white image is used as a reference image. For example, in a case where image composition is performed to generate a composite image after position adjustment is performed by use of a black-and-white image as a reference image such that the position of a color image is adjusted to coincide with the position of the black-and-white image, it is possible to precisely reproduce brightness according to the characteristics of a lens and a sensor used in the black-and-white image capturing unit 112.

Meanwhile, FIG. 5 is a diagram for illustrating image quality to be achieved by an image composition process in which a color image is used as a reference image. For example, in a case where image composition is performed to generate a composite image after position adjustment is performed by use of a color image as a reference image such that the position of a black-and-white image is adjusted to coincide with the position of the color image, no color shift is caused in the composite image. This is because the color image is used as a reference image. Thus, it is possible to precisely reproduce brightness according to the characteristics of the lens and the sensor used in the black-and-white image capturing unit 112.

However, the black-and-white image capturing unit 112 and the color image capturing unit 111 are based on different viewpoints. Thus, the risk of color shift is higher in a near view than in a distant view. Furthermore, the size of an occlusion region increases in a near view as compared to a distant view.

The occlusion region refers to a region that is captured only in one of images and not captured in the other image due to, for example, an obstacle close to the imaging unit, and the like.

FIG. 6 shows an occlusion region in the case of using, as a reference image, a black-and-white image obtained by the black-and-white image capturing unit 112. In a case where occlusion is caused by parallax, there are no image data corresponding to the occlusion region in a color image obtained by the color image capturing unit 111. Therefore, color information is missing in the occlusion region in a composite image generated by the image composition process. Moreover, there is also a possibility that, compared to a pixel in a distant view, a pixel in a near view corresponding to a target pixel in one of captured images may be beyond the search range of parallax detection and accordingly, a parallax vector cannot be calculated. Therefore, a composite image obtained by the image composition process may have a lower image quality than a color image obtained by the color image capturing unit 111 in some cases.

Furthermore, the black-and-white image capturing unit 112 has higher sensitivity than the color image capturing unit 111 using the color filter. Thus, when the brightness of a subject increases, pixel saturation is more likely to occur in the black-and-white image capturing unit 112 than in the color image capturing unit 111. Thus, when the number of saturated pixels increases in a black-and-white image, a color image having a deteriorated image quality is obtained as a composite image, in which the high-brightness portion of the subject is more saturated than in a color image obtained by the color image capturing unit 111.

For this reason, the image processing unit 120 performs image composition determination as to whether or not image quality deteriorates due to parallax or pixel saturation, on the basis of captured images. The image processing unit 120 generates either of the following two types of composite images according to the result of image composition determination:

a composite image in which a color image obtained by the color image capturing unit 111 is used as a reference image, or a composite image in which a black-and-white image obtained by the black-and-white image capturing unit 112 is used as a reference image.

FIG. 7 is a diagram showing a detailed configuration example of the image processing unit 120.

The image processing unit 120 includes preprocessing units 121 and 122, a parallax & occlusion detection unit 123, a reference image determination unit 124, and an image composition unit 125.

The preprocessing units 121 and 122 perform image correction processing such as lens distortion correction, defective pixel correction, and white balance adjustment on image data of captured images obtained by the color image capturing unit 111 and the black-and-white image capturing unit 112. The corrected image data are output to the parallax & occlusion detection unit 123, the reference image determination unit 124, and the image composition unit 125.

The parallax & occlusion detection unit 123 performs parallax detection and occlusion detection on the basis of the black-and-white image data and the color image data supplied from the preprocessing units 121 and 122.

The black-and-white image capturing unit 112 and the color image capturing unit 111 capture images from different viewpoint positions as shown in FIG. 1B. Therefore, captured images obtained by the black-and-white image capturing unit 112 and the color image capturing unit 111 have parallax.

The parallax & occlusion detection unit 123 detects parallax information in pixel units and an occlusion region by performing a corresponding point detection process such as block matching. The detection information is output to the reference image determination unit 124.

The reference image determination unit 124 inputs the black-and-white image data and the color image data supplied from the preprocessing units 121 and 122, and also inputs parallax information and occlusion region detection information detected by the parallax & occlusion detection unit 123. The parallax information is information on parallax detected in units of pixels or image areas of the two pieces of image data.

The reference image determination unit 124 determines which of the color image and the black-and-white image is to be set as a reference image, on the basis of these pieces of information.

The reference image refers to an image serving as a basis when a composite image is generated.

In a case where the color image is set as a reference image, the image composition unit 125 performs pixel value correction based on brightness information obtained from the black-and-white image by using, as a base, the color image data supplied from the preprocessing unit 121, and generates a composite image.

Meanwhile, in a case where the black-and-white image is set as a reference image, the image composition unit 125 performs pixel value correction based on color information obtained from the color image by using, as a base, the black-and-white image data supplied from the preprocessing unit 122, and generates a composite image.

The reference image determination unit 124 determines which of the following two types of composite images may be an image with higher image quality, and selects one of the composite images that can be generated with higher image quality:

the composite image generated by use of the black-and-white image as a reference image, or the composite image generated by use of the color image as a reference image.

Hereinafter, a specific example of the determination process will be described.

The reference image determination unit 124 determines which of the color image and the black-and-white image is to be set as a reference image, on the basis of the parallax information on the two pieces of image data and the occlusion region detection information detected by the parallax & occlusion detection unit 123.

An example of the reference image determination process will be described with reference to FIG. 8.

Occlusion square measure is on the horizontal axis, and parallax is on the vertical axis in a graph shown in FIG. 8.

The occlusion square measure on the horizontal axis corresponds to the occupancy rate (%) of occlusion regions included in the image areas of two images of the color image captured by the color image capturing unit 111 and the black-and-white image captured by the black-and-white image capturing unit 112.

The parallax on the vertical axis is parallax (for example, the number of pixels) between the two images of the color image captured by the color image capturing unit 111 and the black-and-white image captured by the black-and-white image capturing unit 112.

The reference image determination unit 124 first calculates the above-described occlusion region occupancy rate and parallax in units of divided areas obtained as a result of dividing the images.

This processing will be described with reference to FIG. 9.

Figure 9:
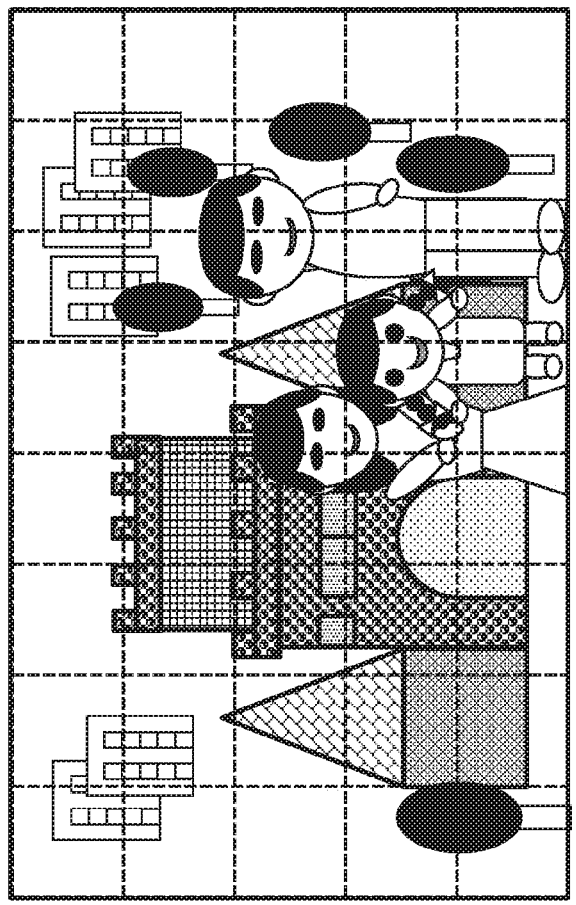
FIG. 9 is a diagram illustrating the example of the reference image determination process.

FIG. 9 shows a color image captured by the color image capturing unit 111 or a black-and-white image captured by the black-and-white image capturing unit 112.

The reference image determination unit 124 selects either of the two images, and sets a plurality of divided areas in the selected image. Areas divided by dotted lines shown in FIG. 9 correspond to the divided areas.

The reference image determination unit 124 calculates an occlusion region occupancy rate and a parallax (average value) for each divided area.

For example, 40 (8×5=40) divided areas are set in the example shown in FIG. 9, so that 40 occlusion region occupancy rates and 40 parallaxes (average values) are calculated.

The 40 occlusion region occupancy rates and the 40 parallaxes (average values) are plotted on the graph shown in FIG. 8.

That is, coordinates (x, y) are plotted on the graph shown in FIG. 8 when x and y are defined as follows:

occlusion region occupancy rate=x, and parallax (average value)=y.

With this processing, if, for example, 50% or more of the coordinates are included in a color image-based area, the color image is used as a reference image.

Furthermore, if 50% or more of the coordinates are included in a black-and-white image-based area, the black-and-white image is used as a reference image.

The reference image determination unit 124 determines a reference image by such processing.

Note that the above-described processing is an example, and other processing is also possible.

For example, it is also possible to perform a process of determining a reference image while a greater weight is set on a divided area in the central region of an image such that the occlusion region occupancy rate and parallax (average value) of the central region are more greatly reflected in determination of the reference image.

Alternatively, a process of determining a reference image may be performed with a higher weight set on a divided area where a face area has been detected.

As understood from the graph shown in FIG. 8, a black-and-white image is used as a reference image in a case where the occlusion square measure occupancy rate is lower than a threshold Thx and the parallax is lower than a parallax threshold Thy.

Meanwhile, a color image is used as a reference image in a case where the occlusion square measure occupancy rate is equal to or higher than the threshold Thx or the parallax is equal to or higher than the parallax threshold Thy.

The reference image determination unit 124 determines a reference image by such processing.

In a case where the occlusion square measure occupancy rate is small and the parallax is small, it is possible to generate a high-quality image by applying precise brightness information of the black-and-white image to the entire image while using the black-and-white image as a reference image.

That is, in a case where the occlusion square measure occupancy rate is small and the parallax is small, color information cannot be obtained in a small area of the color image due to occlusion, and in addition, a color shift is less likely to be caused by parallax. Accordingly, a high-quality black-and-white image-based composite image is generated by application of precise brightness information of the black-and-white image to the entire image while the black-and-white image is used as a reference image.

Meanwhile, in a case where the occlusion square measure occupancy rate is large or the parallax is large, there is a possibility that color information cannot be obtained in a large area of the color image due to occlusion or a problem of a color shift is caused by parallax in a large area. Accordingly, in order to reduce these problems, a color image-based composite image is generated while the color image is used as a reference image.

Note that there is performed a composite image generation process to which the brightness information of the black-and-white image is applied, also in generating a color image-based composite image.

Note that the reference image determination process described with reference to FIGS. 8 and 9 is an example, and the reference image determination unit 124 may be configured to use other image feature amounts to determine which of the following two types of composite images is higher in image quality and select one of the composite images that can be generated with higher image quality:

a composite image generated by use of a black-and-white image as a reference image, or a composite image generated by use of a color image as a reference image.

Information on the reference image determined by the reference image determination unit 124 is input to the image composition unit 125.

The image composition unit 125 inputs the black-and-white image data and the color image data supplied from the preprocessing units 121 and 122 and the information on the reference image determined by the reference image determination unit 124.

In a case where the reference image determined by the reference image determination unit 124 is the color image, the image composition unit 125 performs pixel value correction based on the brightness information obtained from the black-and-white image by using, as a base, the color image data supplied from the preprocessing unit 121, and generates a composite image.

In this case, image composition is performed to generate a composite image after the position of the black-and-white image is adjusted to coincide with the position of the color image.

Meanwhile, in a case where the reference image determined by the reference image determination unit 124 is the black-and-white image, pixel value correction based on the color information obtained from the color image is performed by use of, as a base, the black-and-white image data supplied from the preprocessing unit 122, and a composite image is generated.

In this case, image composition is performed to generate a composite image after the position of the color image is adjusted to coincide with the position of the black-and-white image.

However, the following problem occurs when such a composite image generation process is performed.

This problem will be described with reference to FIGS. 10 and 11.

This problem occurs in a case where a moving image is captured.

As described above, either of the following two types of composite images is generated as an image to be finally output:

(a) a color image-based composite image based on a color image, or (b) a black-and-white image-based composite image based on a black-and-white image.

Which image to be generated is determined on the basis of information on determination by the reference image determination unit 124.

As described above with reference to FIG. 8, the reference image determination unit 124 determines which image is to be used as a reference image on the basis of, for example, the occlusion region and parallax of the two images (color image and black-and-white image).

However, when a moving image is captured, the occlusion region and parallax of the two images (color image and black-and-white image) successively change.

Therefore, as shown in, for example, FIG. 10, there is a possibility that while a moving image is being captured, the occlusion region and the parallax may change significantly within an area P or Q extending across the occlusion square measure threshold Thx or the parallax threshold Thy, respectively.

That is, there is a possibility of going back and forth between the color image-based area and the black-and-white image-based area.

When such a situation arises, a phenomenon occurs in which the reference images are switched for each frame as shown in (a) an example of moving image frame sequence in the lower part of FIG. 10.

As described above with reference to FIGS. 1A and 1B, the color image capturing unit and the black-and-white image capturing unit are set at different positions, so that there is positional displacement between captured images.

Figure 11:
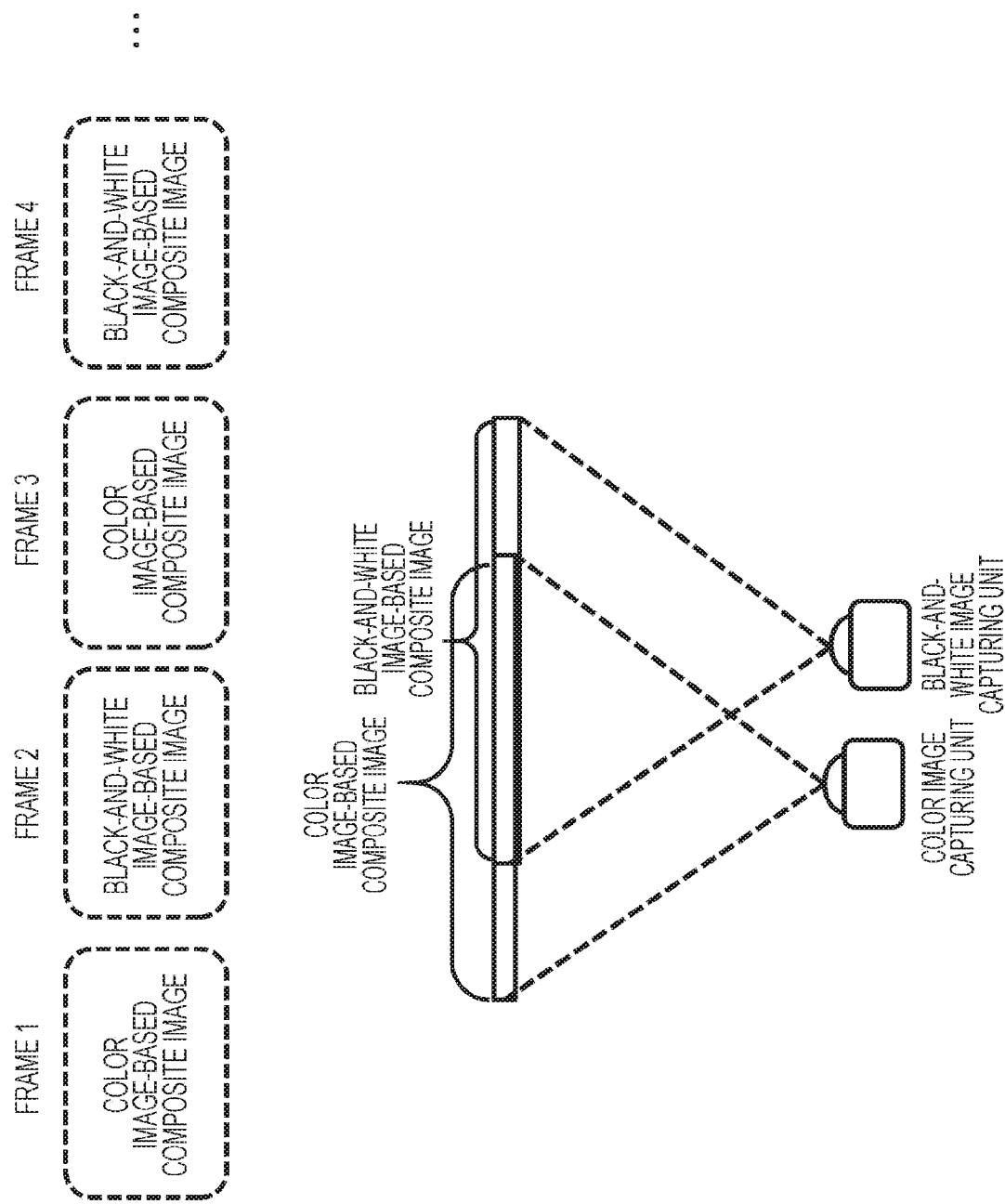
FIG. 11 is a diagram illustrating the problem to be caused by the switching of reference images.

As shown in FIG. 11, the color image-based composite image and the black-and-white image-based composite image are different images with positional displacement.

When such two images with positional displacement are frequently switched in a short time, a user observing the images recognizes an image shake and has a sense of discomfort.

Described below are the configuration and processing of the image processing apparatus according to the present disclosure that solves this problem.

3. Regarding Reference Image Determination Process to Be Performed by Reference Image Determination Unit Described below is a reference image determination process to be performed by the image processing apparatus according to the present disclosure.

The configuration and processing of the reference image determination unit 124 of the image processing apparatus 100 according to the present disclosure will be described with reference to FIG. 12 and subsequent drawings.

Figure 12:
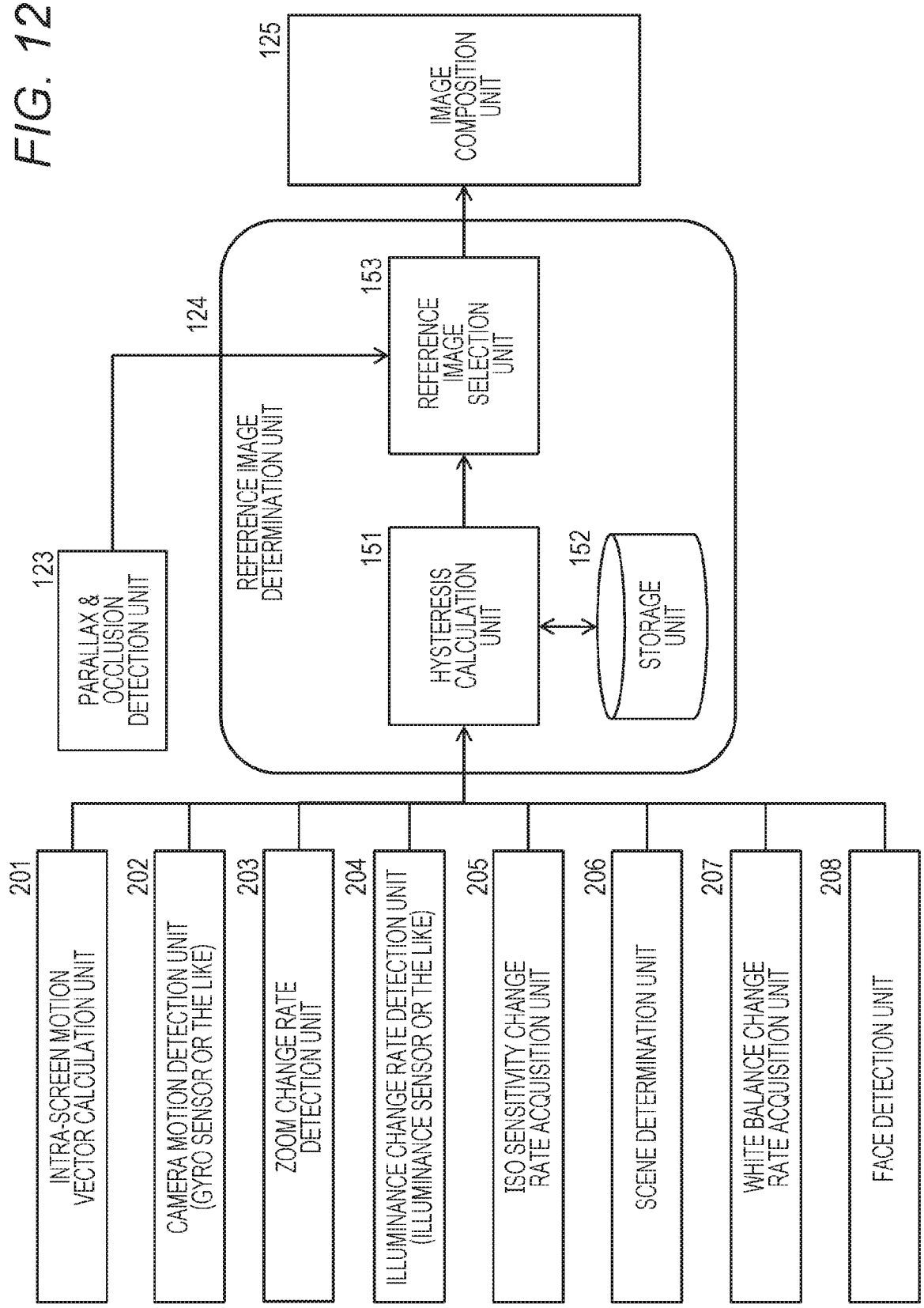
FIG. 12 is a diagram illustrating a configuration and processing of a reference image determination unit.

As shown in FIG. 12, the reference image determination unit 124 of the image processing apparatus 100 according to the present disclosure includes a hysteresis calculation unit 151, a storage unit 152, and a reference image selection unit 153.

The hysteresis calculation unit 151 acquires detection information from an intra-screen motion vector calculation unit 201, a camera motion detection unit (gyro sensor or the like) 202, a zoom change rate detection unit 203, an illuminance change rate detection unit (illuminance sensor or the like) 204, an ISO sensitivity change rate acquisition unit 205, a scene determination unit 206, a white balance change rate acquisition unit 207, and a face detection unit 208.

Note that the intra-screen motion vector calculation unit 201, the camera motion detection unit (gyro sensor or the like) 202, the zoom change rate detection unit 203, the illuminance change rate detection unit (illuminance sensor or the like) 204, the ISO sensitivity change rate acquisition unit 205, the scene determination unit 206, the white balance change rate acquisition unit 207, and the face detection unit 208 are constituent elements of the image processing apparatus 100. Each of these constituent elements may be configured in the reference image determination unit 124 or the hysteresis calculation unit 151, or may be configured outside the reference image determination unit 124 or the hysteresis calculation unit 151.

For example, some of these constituent elements may be configured in the hysteresis calculation unit 151. In this case, the hysteresis calculation unit 151 generates and acquires detection information by itself. For example, in a case where the intra-screen motion vector calculation unit 201 is provided in the hysteresis calculation unit 151, it is possible to perform a process of inputting a color image and a black-and-white image to the hysteresis calculation unit 151 and analyzing these images to acquire motion vectors.

The hysteresis calculation unit 151 acquires the detection information from the intra-screen motion vector calculation unit 201 to the face detection unit 208, and calculates hysteresis on the basis of these pieces of detection information.

The hysteresis will be described with reference to FIG. 13.

Figure 13:
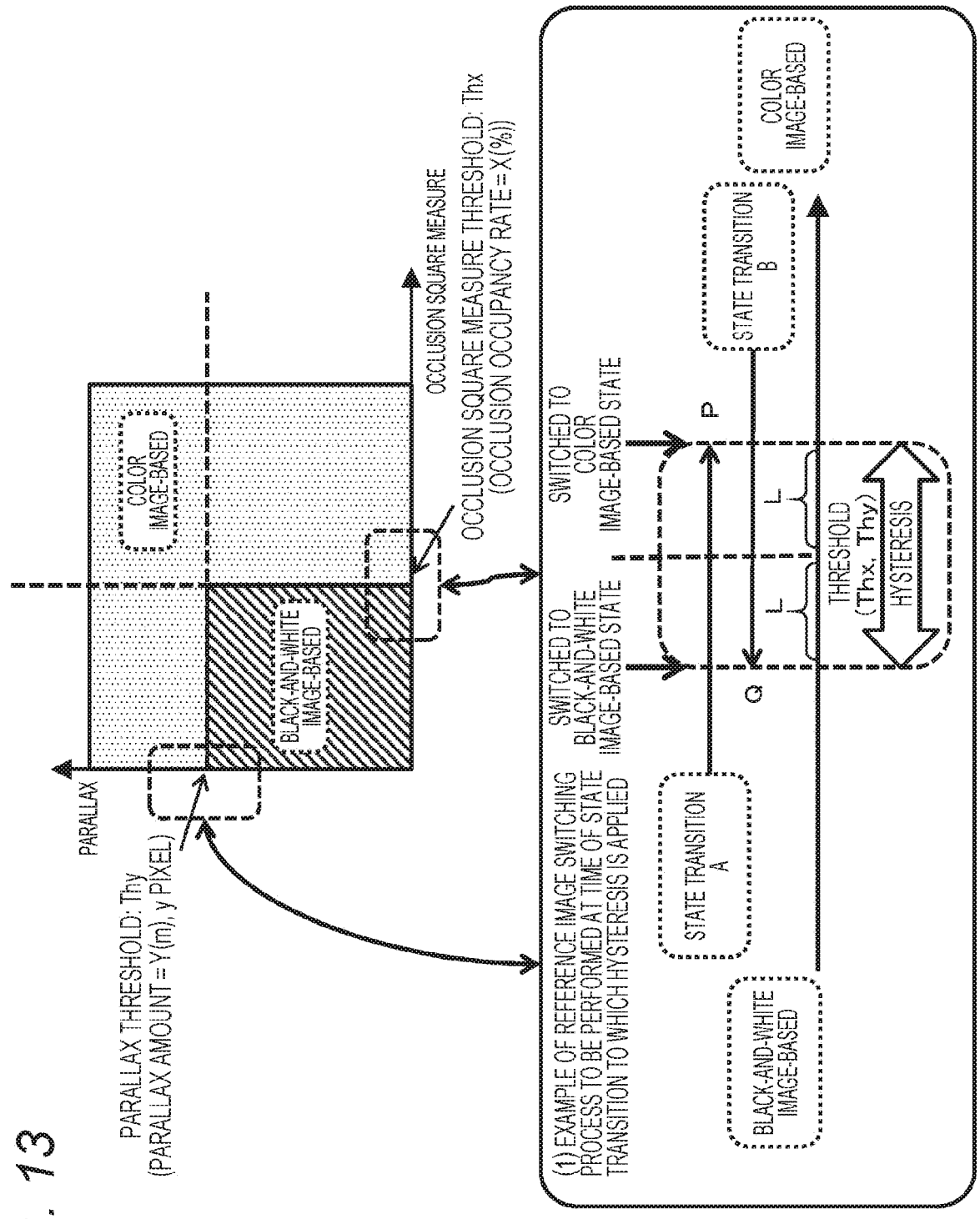
FIG. 13 is a diagram illustrating a reference image switching process to which hysteresis is applied.

An enlarged view of an area in the vicinity of the threshold in a reference image determination graph based on occlusion square measure and parallax shown in the upper part of FIG. 13 is shown as (1) an example of a reference image switching process to be performed at the time of state transition, to which hysteresis is applied, in the lower part of FIG. 13.

The shown area corresponds to an area in the vicinity of the occlusion square measure threshold (Thx) or the parallax threshold (Thy).

In a case where a state transition A shown in FIG. 13(1) occurs while a moving image is being captured, that is, in a case where a state (occlusion or parallax) changes from the black-and-white image-based area to the color image-based area beyond the threshold, the reference image determination unit 124 of the image processing apparatus 100 according to the present disclosure maintains the current reference image (black-and-white image) without switching the reference images at the threshold (Thx or Thy) until the state reaches a position P located away from the threshold. When the state changes beyond the position P, the reference image is switched from the black-and-white image to the color image.

Similarly, in a case where a state transition B shown in FIG. 13(1) occurs, that is, in a case where the state (occlusion or parallax) changes from the color image-based area to the black-and-white image-based area beyond the threshold, the reference image determination unit 124 of the image processing apparatus 100 according to the present disclosure maintains the current reference image (color image) without switching the reference images at the threshold (Thx or Thy) until the state reaches a position Q located away from the threshold. When the state changes beyond the position Q, the reference image is switched from the color image to the black-and-white image.

That is, the reference images are not switched at the threshold as a boundary. Instead, a predetermined hysteresis is set and the reference images are switched at a position beyond the threshold.

As a result of setting such a hysteresis, it is possible to prevent an image shake due to the frequent switching of the reference images as described above with reference to FIGS. 10 and 11.

Note that the reference image determination unit 124 of the image processing apparatus 100 according to the present disclosure performs control to change the magnitude of this hysteresis (amount of hysteresis) on the basis of the detection information from the intra-screen motion vector calculation unit 201 to the face detection unit 208 shown in FIG. 12.

The example shown in FIG. 13(1) is based on the following assumption: the magnitude of hysteresis (the amount of hysteresis)=2L. This amount of hysteresis is changed on the basis of the detection information from the intra-screen motion vector calculation unit 201 to the face detection unit 208.

For example, FIG. 14A shows an example of a reference image switching process to be performed at the time of state transition, to which reference hysteresis is applied. The reference image determination unit 124 increases the amount of hysteresis as shown in FIG. 14B on the basis of the detection information from the intra-screen motion vector calculation unit 201 to the face detection unit 208.

FIG. 14B shows an example of a reference image switching process to be performed at the time of state transition, to which enhanced hysteresis is applied. In this case, the switching of the reference images is less likely to occur than in the reference image switching process to be performed at the time of state transition, to which reference hysteresis is applied.

Furthermore, the reference image determination unit 124 also performs control to reduce the amount of hysteresis, as shown in FIG. 15B, on the basis of the detection information from the intra-screen motion vector calculation unit 201 to the face detection unit 208.

FIG. 15B shows an example of a reference image switching process to be performed at the time of state transition, to which reduced hysteresis is applied. In this case, the switching of the reference images is more likely to occur than in the reference image switching process to be performed at the time of state transition, to which reference hysteresis is applied.

As described with reference to FIG. 12, the reference image determination unit 124 includes the hysteresis calculation unit 151, the storage unit 152, and the reference image selection unit 153.

The reference image determination unit 124 determines which of the following two types of composite images (a) and (b) is to be generated:

(a) a color image-based composite image in which the position of a black-and-white image is adjusted to coincide with the position of a color image, or (b) a black-and-white image-based composite image in which the position of the color image is adjusted to coincide with the position of the black-and-white image.

That is, the reference images are switched on the basis of a predetermined reference image switching threshold.

The reference image determination unit 124 sets, as the reference image switching threshold, the hysteresis described with reference to FIGS. 13, 14A, 14B, 15A and 15B, and also performs control to change the set hysteresis according to the situation.

The hysteresis calculation unit 151 of the reference image determination unit 124 changes the magnitude of hysteresis on the basis of the detection information from the intra-screen motion vector calculation unit 201, the camera motion detection unit (gyro sensor or the like) 202, the zoom change rate detection unit 203, the illuminance change rate detection unit (illuminance sensor or the like) 204, the ISO sensitivity change rate acquisition unit 205, the scene determination unit 206, the white balance change rate acquisition unit 207, and the face detection unit 208. That is, the hysteresis calculation unit 151 performs control to change the amount of hysteresis.

Note that, specifically, an adjustment value for a reference hysteresis of a predetermined magnitude (P to Q=2L shown in FIG. 13(1)) is calculated on the basis of each detection information from the intra-screen motion vector calculation unit 201 to the face detection unit 208. Then, the calculated adjustment value is applied to calculate a hysteresis to be finally applied.

That is, the hysteresis (the amount of the hysteresis) to be finally applied is calculated as follows:

hysteresis=reference hysteresis+adjustment value.

A specific process sequence will be described later.

The storage unit 152 in the reference image determination unit 124 shown in FIG. 12 stores, for example, the following data:

(1) the occlusion square measure threshold (Thx) and the parallax threshold (Thy), (2) a reference hysteresis (=default hysteresis), (3) a calculated hysteresis that is a hysteresis calculated on the basis of each detection information (hysteresis control parameter) from the intra-screen motion vector calculation unit 201 to the face detection unit 208, (4) a threshold (threshold corresponding to a hysteresis control parameter) set in such a way as to correspond to each detection information from the intra-screen motion vector calculation unit 201 to the face detection unit 208, and (5) an adjustment value corresponding to each detection information (hysteresis control parameter) from the intra-screen motion vector calculation unit 201 to the face detection unit 208.

The reference image selection unit 153 controls the switching of reference images by applying a hysteresis calculated by the hysteresis calculation unit 151.

As described above, the hysteresis calculation unit 151 acquires the detection information from the intra-screen motion vector calculation unit 201, the camera motion detection unit (gyro sensor or the like) 202, the zoom change rate detection unit 203, the illuminance change rate detection unit (illuminance sensor or the like) 204, the ISO sensitivity change rate acquisition unit 205, the scene determination unit 206, the white balance change rate acquisition unit 207, and the face detection unit 208.

The intra-screen motion vector calculation unit 201 calculates a motion vector for each pixel or image area on the basis of at least either a color image captured by the color image capturing unit 111 or a black-and-white image captured by the black-and-white image capturing unit 112.

For example, the average value of the calculated motion vectors is input to the hysteresis calculation unit 151.

Note that the intra-screen motion vector calculation unit 201 may perform calculation to obtain, for example, a value calculated with a greater weight set on a motion vector in the central part of an image or a value calculated with a greater weight set on a motion vector in a face detection area, and may input the calculated value to the hysteresis calculation unit 151.

The camera motion detection unit (gyro sensor or the like) 202 acquires, for example, a detection value of a gyro sensor included in a camera (image processing apparatus 100), that is, camera motion information, and outputs the acquired information to the hysteresis calculation unit 151.

The zoom change rate detection unit 203 acquires the change rate of the zoom setting of the camera (image processing apparatus 100). That is, the zoom change rate detection unit 203 acquires information on the change rate of the zoom setting, and outputs the acquired information to the hysteresis calculation unit 151.

The illuminance change rate detection unit (illuminance sensor or the like) 204 acquires illuminance change rate information based on a detection value of an illuminance sensor included in the camera (image processing apparatus 100), and outputs the acquired information to the hysteresis calculation unit 151.

The ISO sensitivity change rate acquisition unit 205 acquires ISO sensitivity change rate information from the camera (image processing apparatus 100), and outputs the acquired information to the hysteresis calculation unit 151.

The scene determination unit 206 determines a scene switching state of each frame of a moving image on the basis of at least either the color image captured by the color image capturing unit 111 or the black-and-white image captured by the black-and-white image capturing unit 112. Specifically, the scene determination unit 206 calculates, for example, an inter-frame image change rate (scene change determination index value) in accordance with a predetermined rule, and outputs the calculated rate to the hysteresis calculation unit 151.

The white balance change rate acquisition unit 207 acquires, from the image processing unit or the storage unit, the change rate of a white balance setting value to be applied to a captured image, and outputs the acquired rate to the hysteresis calculation unit 151.

The face detection unit 208 performs face detection based on at least either the color image captured by the color image capturing unit 111 or the black-and-white image captured by the black-and-white image capturing unit 112. As a result, the face detection unit 208 calculates, for example, information on whether or not a face has been detected in an image or information on the occupancy rate of a face area included in the image, and outputs the calculated information to the hysteresis calculation unit 151.

4. Regarding Sequence of Processing to Be Performed by Reference Image Determination Unit Next, a sequence of processing to be performed by the reference image determination unit 124 of the image processing apparatus 100 according to the present disclosure will be described with reference to a flowchart shown in FIG. 16.

Note that the processing according to this flow can be performed according to a program stored in the storage unit, and can be performed as, for example, a program execution process by a processor such as a CPU having a program execution function.

Figure 16:
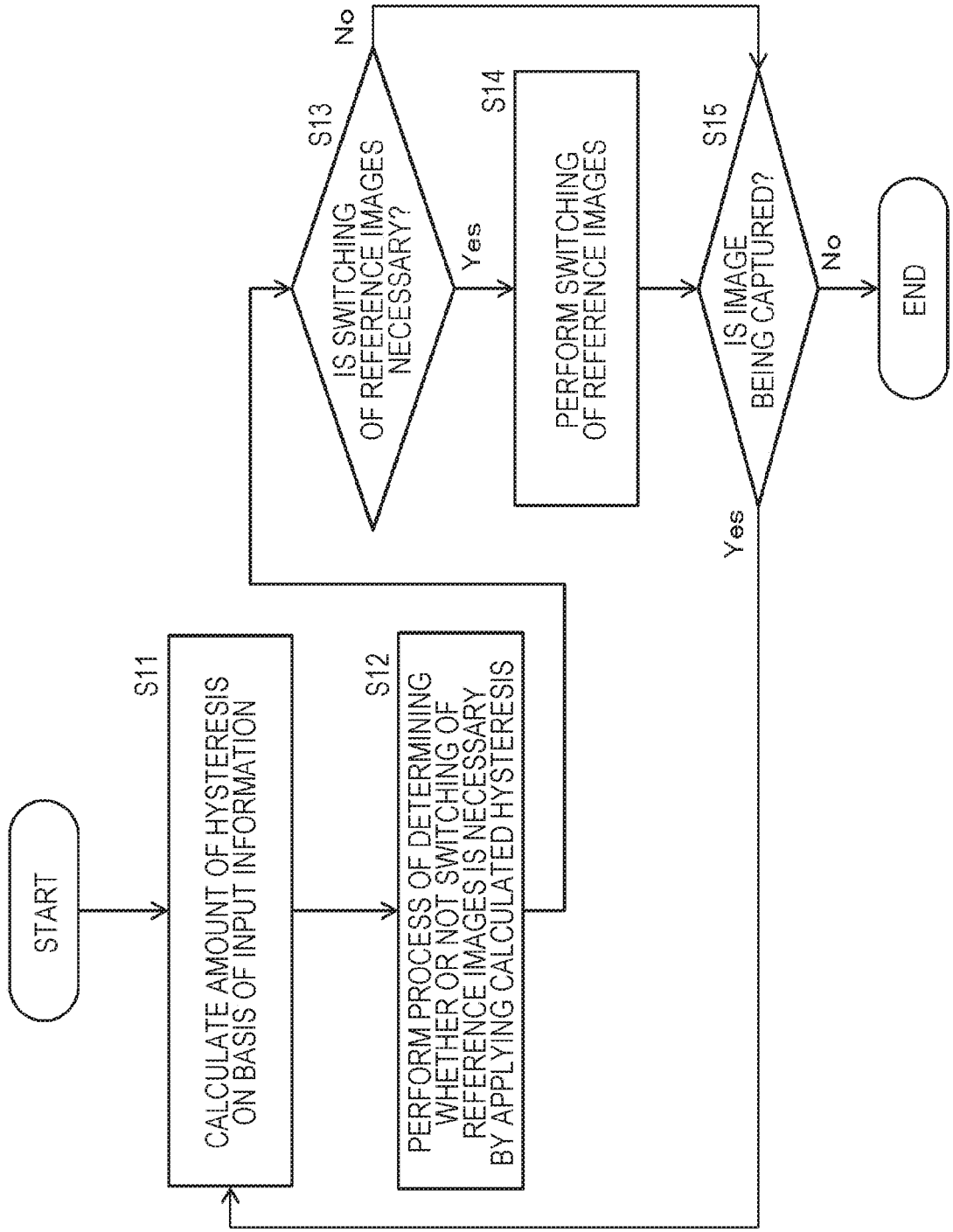
FIG. 16 is a diagram showing a flowchart illustrating a sequence of processing to be performed by the reference image determination unit.

The processing of each step shown in the flowchart of FIG. 16 will be described below.

(Step S11)

First, the reference image determination unit 124 performs a hysteresis calculation process based on input information in step S11.

This process is performed in the hysteresis calculation unit 151 of the reference image determination unit 124.

The hysteresis calculation unit 151 calculates a hysteresis on the basis of the detection information from the intra-screen motion vector calculation unit 201, the camera motion detection unit (gyro sensor or the like) 202, the zoom change rate detection unit 203, the illuminance change rate detection unit (illuminance sensor or the like) 204, the ISO sensitivity change rate acquisition unit 205, the scene determination unit 206, the white balance change rate acquisition unit 207, and the face detection unit 208.

The specific calculation process sequence will be described later with reference to a flow shown in FIG. 17.

(Steps S12 and S13)

Next, in steps S12 and S13, the reference image determination unit 124 applies the hysteresis calculated in step S11 to determine whether or not the reference image switching process is necessary.

This process is performed in the reference image selection unit 153 of the reference image determination unit 124.

The reference image selection unit 153 applies the hysteresis calculated in step S11 to determine whether or not the reference image switching process is necessary.

The reference image selection unit 153 inputs the black-and-white image data and the color image data supplied from the preprocessing units 121 and 122, and also inputs parallax information and occlusion region detection information detected by the parallax & occlusion detection unit 123. The parallax information is information on parallax detected in units of pixels of the two pieces of image data.

The reference image determination unit 124 applies these pieces of information and the hysteresis calculated in step S11 to determine whether or not the reference image switching process is necessary.

That is, the reference image determination unit 124 determines whether or not a state (parallax or occlusion region) has changed to go across the hysteresis boundary point P or Q in, for example, the state transition A or the state transition B described above with reference to FIG. 13(1). As a result, the reference image determination unit 124 determines whether or not the reference image switching process is necessary.

Note that the amount of hysteresis has a magnitude set as the result of hysteresis calculation in step S11.

In a case where it is determined in step S13 that the reference image switching process is necessary, the process proceeds to step S14.

Meanwhile, in a case where it is determined in step S13 that the reference image switching process is unnecessary, the process proceeds to step S15.

(Step S14)

In a case where it is determined in step S13 that the reference image switching process is necessary, the process proceeds to step S14.

In step S14, the reference image selection unit 153 performs the reference image switching process.

(Step S15)

In a case where the reference image switching process is performed in step S13, or in a case where it is determined in step S13 that the reference image switching process is unnecessary, the process proceeds to step SS15.

In step S15, the reference image determination unit 124 of the image processing apparatus 100 determines whether or not an image capturing process is being performed. If the image capturing process is being performed, the reference image determination unit 124 repeats the processing of step S11 and the subsequent steps.

In a case where the image capturing process is completed, the process ends.

Note that the reference image determination unit 124 of the image processing apparatus 100 performs control to change hysteresis by continuously and repeatedly performing this flow while, for example, a moving image is being captured.

Next, a specific example of the hysteresis calculation process to be performed in step S11, that is, the hysteresis calculation process to be performed by the reference image determination unit 124 on the basis of input information will be described with reference to flows shown in FIGS. 17 to 19.

(Steps S101a to h)

Figure 17:
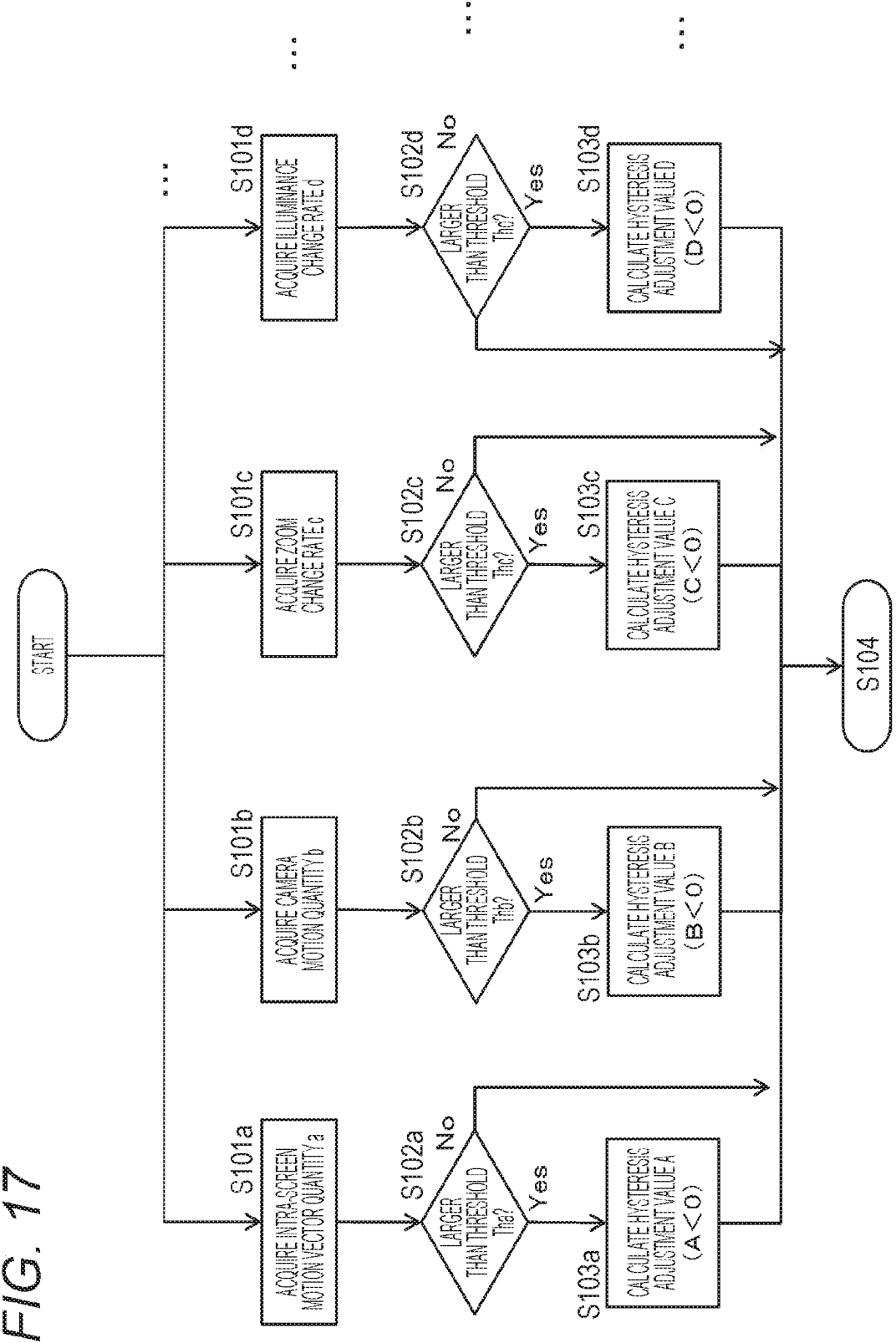
FIG. 17 is a diagram showing a flowchart illustrating a sequence of processing to be performed by the reference image determination unit.
Figure 18:
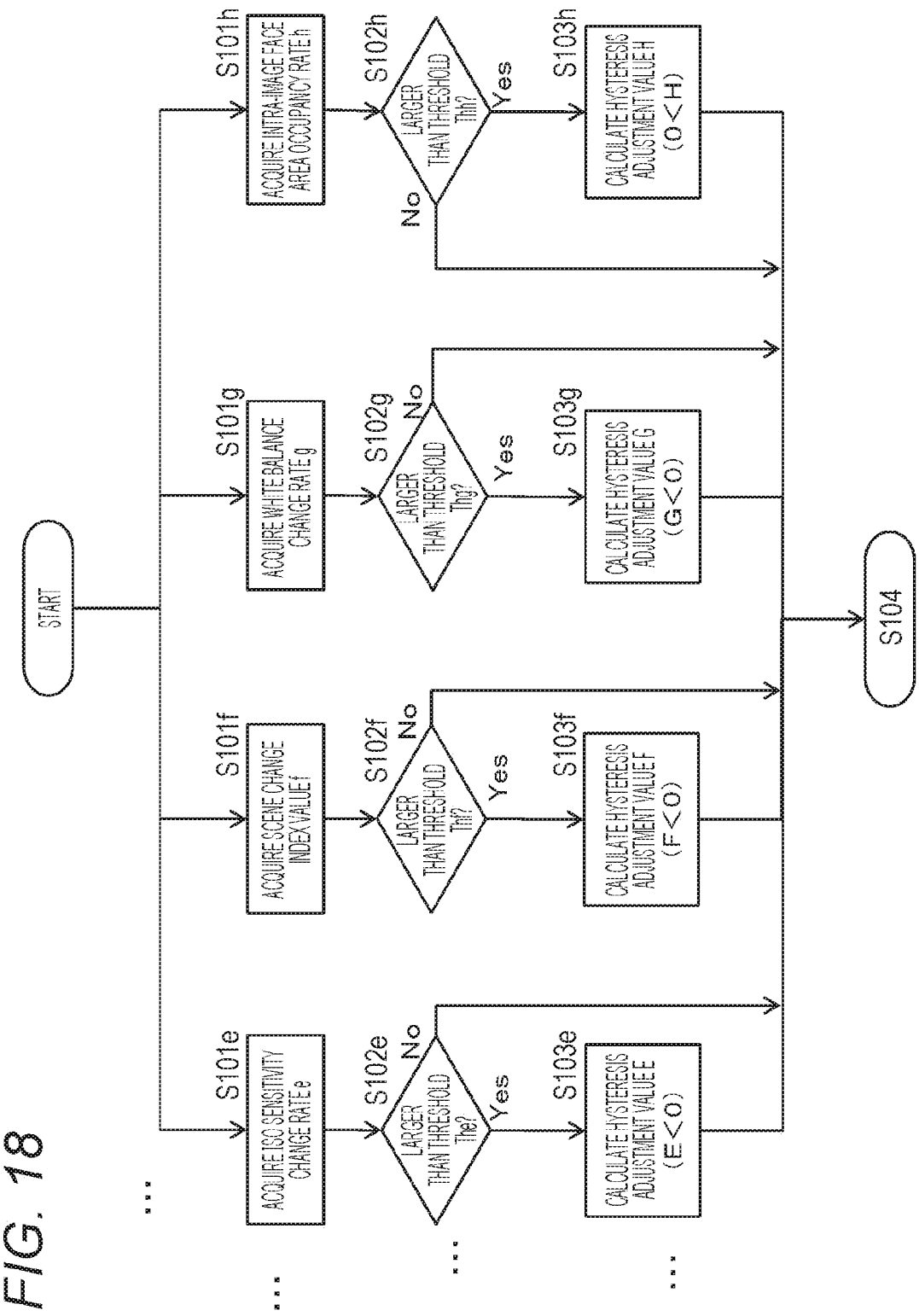
FIG. 18 is a diagram showing a flowchart illustrating a sequence of processing to be performed by the reference image determination unit.
Figure 19:
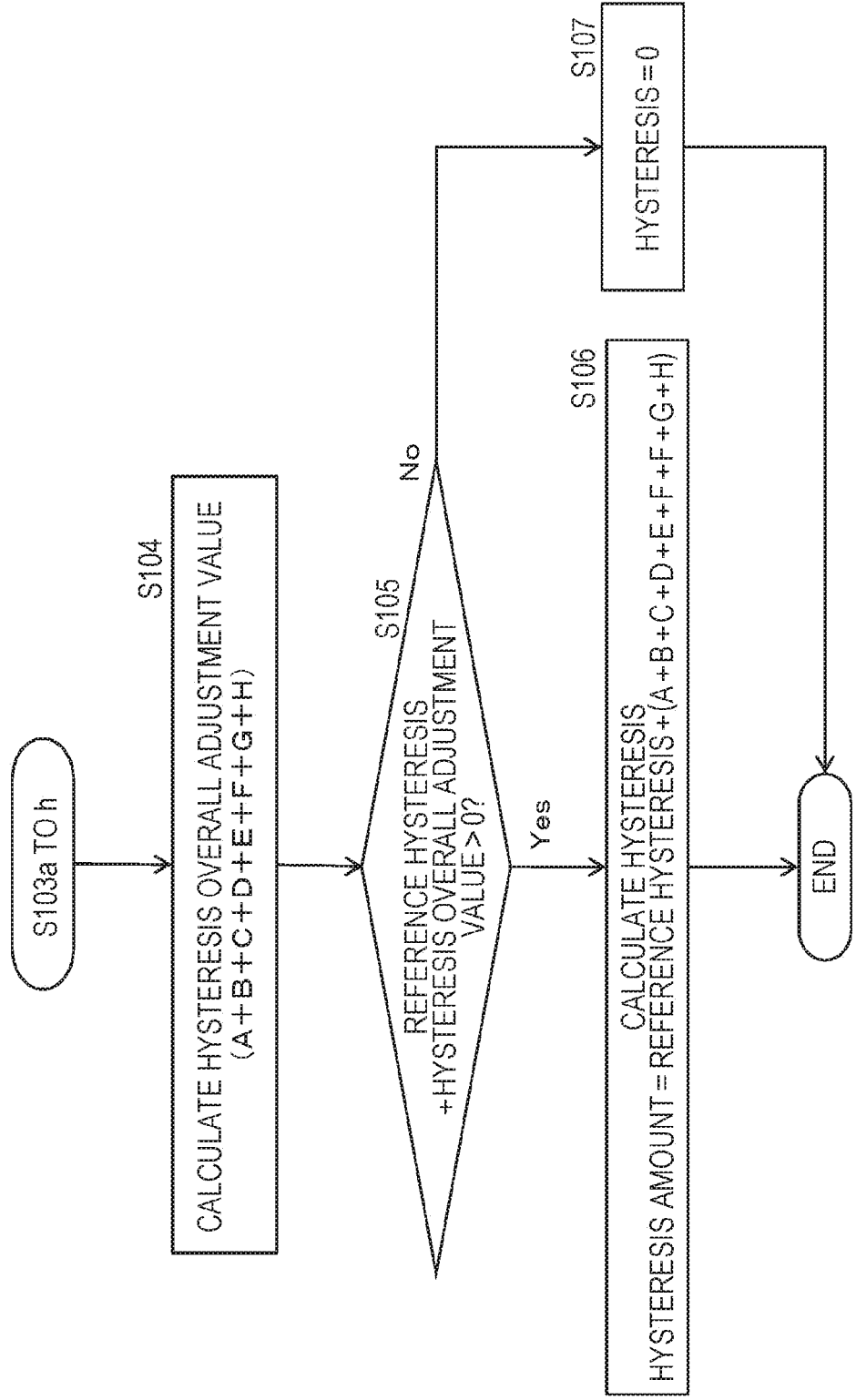
FIG. 19 is a diagram showing a flowchart illustrating a sequence of processing to be performed by the reference image determination unit.

The processes of steps S101a to h shown in FIGS. 17 and 18 correspond to processes in which the hysteresis calculation unit 151 acquires each detection information (hysteresis control parameter). These processes can be performed in parallel or sequentially.

The hysteresis calculation unit 151 acquires the detection information from the intra-screen motion vector calculation unit 201, the camera motion detection unit (gyro sensor or the like) 202, the zoom change rate detection unit 203, the illuminance change rate detection unit (illuminance sensor or the like) 204, the ISO sensitivity change rate acquisition unit 205, the scene determination unit 206, the white balance change rate acquisition unit 207, and the face detection unit 208.

In step S101a, a motion vector quantity a calculated by the intra-screen motion vector calculation unit 201 is acquired.

As described above, the intra-screen motion vector calculation unit 201 calculates a motion vector for each pixel or image area on the basis of at least either a color image captured by the color image capturing unit 111 or a black-and-white image captured by the black-and-white image capturing unit 112.

For example, the average value of calculated motion vectors is input as the motion vector quantity a to the hysteresis calculation unit 151.

Note that, for example, the intra-screen motion vector calculation unit 201 may input, to the hysteresis calculation unit 151, a value calculated with a greater weight set on a motion vector in the central part of an image or a value calculated with a greater weight set on a motion vector in a face detection area.

In step S101b, a camera motion quantity b detected by the camera motion detection unit (gyro sensor or the like) 202 is acquired.

As described above, the camera motion detection unit (gyro sensor or the like) 202 acquires, for example, a detection value of the gyro sensor included in the camera (image processing apparatus 100), that is, camera motion information, and outputs the acquired information to the hysteresis calculation unit 151.

In step S101c, a zoom change rate c detected by the zoom change rate detection unit 203 is acquired.

As described above, the zoom change rate detection unit 203 acquires zoom change rate information from a zoom setting value provided in the camera (image processing apparatus 100), and outputs the acquired information to the hysteresis calculation unit 151.

In step S101d, an illuminance d detected by the illuminance change rate detection unit (illuminance sensor or the like) 204 is acquired.

As described above, the illuminance change rate detection unit (illuminance sensor or the like) 204 acquires illuminance change rate information from the detection value of the illuminance sensor included in the camera (image processing apparatus 100), and outputs the acquired information to the hysteresis calculation unit 151.

In step S101e, an ISO sensitivity change rate e acquired by the ISO sensitivity change rate acquisition unit 205 is acquired.

As described above, the ISO sensitivity change rate acquisition unit 205 acquires ISO sensitivity change rate information recorded in a memory of the camera (image processing apparatus 100), and outputs the acquired information to the hysteresis calculation unit 151.

In step S101f, a scene change determination index value f is acquired from the scene determination unit 206.

As described above, the scene determination unit 206 determines a scene switching state of each frame of a moving image on the basis of at least either the color image captured by the color image capturing unit 111 or the black-and-white image captured by the black-and-white image capturing unit 112. Specifically, the scene determination unit 206 calculates, for example, an inter-frame image change rate (scene change determination index value) in accordance with a predetermined rule, and outputs the calculated rate to the hysteresis calculation unit 151.

Note that the scene change determination index value f is an index value that increases as a scene change rate increases.

In step S101g, a white balance change rate g is acquired from the white balance change rate acquisition unit 207.

As described above, the white balance change rate acquisition unit 207 acquires, from the image processing unit or the storage unit, the white balance change rate to be applied to a captured image, and outputs the acquired rate to the hysteresis calculation unit 151.

In step S101h, an intra-image face area occupancy rate h is acquired from the face detection unit 208.

As described above, the face detection unit 208 performs face detection based on at least either the color image captured by the color image capturing unit 111 or the black-and-white image captured by the black-and-white image capturing unit 112.

Thus, the face detection unit 208 calculates, for example, information on whether or not a face has been detected in an image or information on the occupancy rate of a face area included in the image, and outputs the calculated information to the hysteresis calculation unit 151.

(Steps S102a to h and Steps S103a to h)

Next, the hysteresis calculation unit 151 of the reference image determination unit 124 performs a process of comparing the information a to h (hysteresis control parameters) input in steps S101a to h with respective preset thresholds (Tha to Thh=thresholds corresponding to hysteresis control parameters).

Note that these thresholds (Tha to Thh) are stored in the storage unit 152.

Next, in steps S103a to h, hysteresis adjustment values A to H are calculated on the basis of the results of comparison.

Each of the hysteresis adjustment values A to H is a predetermined value, and is stored in the storage unit 152. Furthermore, these values can be changed by a user.

Hereinafter, processing corresponding to each of the input information a to h (hysteresis control parameters) will be sequentially described.

In step S102a, the motion vector quantity a calculated by the intra-screen motion vector calculation unit 201 is compared with the threshold Tha.

$a > Tha$

In a case where the above expression holds, the hysteresis adjustment value A is calculated (obtained from the storage unit 152) in step S103a.

Note that the hysteresis adjustment value A is a value of 0 or less.

That is, in a case where the motion vector quantity a is larger than the threshold Tha, the adjustment value A (A<0) is calculated in such a way as to reduce hysteresis.

$a > Tha$

Meanwhile, in a case where the above expression does not hold in step S102a, the adjustment value A calculation process of step S103a is omitted, and the process proceeds to step S104.

In this case, the adjustment value A is set such that the adjustment value A=0.

That is, the motion vector quantity corresponding adjustment value A is calculated such that hysteresis is reduced in a case where the motion vector quantity a is larger than the threshold Tha and that the amount of hysteresis is not changed in other cases.

This process corresponds to the following process. In a case where a motion in an image is large, an image shake associated with the switching of reference images is less likely to be noticed. Thus, hysteresis is reduced so that the occurrence of the switching of reference images is not excessively reduced. Meanwhile, in a case where the motion in the image is small, an image shake associated with the switching of reference images is likely to be noticed. Thus, hysteresis is not reduced, so that the occurrence of the switching of reference images can be reduced.

In step S102b, the camera motion quantity b detected by the camera motion detection unit (gyro sensor or the like) 202 is compared with the threshold Thb.

$b > Thb$

In a case where the above expression holds, the hysteresis adjustment value B is calculated (obtained from the storage unit 152) in step S103b.

Note that the hysteresis adjustment value B is a value of 0 or less.

That is, in a case where the camera motion quantity b is larger than the threshold Thb, the adjustment value B (B<0) is calculated in such a way as to reduce hysteresis.

$b > Thb$

Meanwhile, in a case where the above expression does not hold in step S102b, the adjustment value B calculation process of step S103b is omitted, and the process proceeds to step S104.

In this case, the adjustment value B is set such that the adjustment value B=0.

That is, the camera motion quantity corresponding adjustment value B is calculated such that hysteresis is reduced in a case where the camera motion quantity b is larger than the threshold Thb and that the amount of hysteresis is not changed in other cases.

This process corresponds to the following process. In a case where the camera motion quantity is large, an image shake associated with the switching of reference images is less likely to be noticed. Thus, hysteresis is reduced so that the occurrence of the switching of reference images is not excessively reduced. Meanwhile, in a case where the camera motion quantity is small, an image shake associated with the switching of reference images is likely to be noticed. Thus, hysteresis is not reduced, so that the occurrence of the switching of reference images can be reduced.

In step S102c, the zoom change rate c detected by the zoom change rate acquisition unit 203 is compared with the threshold Thc.

$$c > Thc$$

In a case where the above expression holds, the hysteresis adjustment value C is calculated (obtained from the storage unit 152) in step S103c.

Note that the hysteresis adjustment value C is a value of 0 or less.

That is, in a case where the zoom change rate c is larger than the threshold Thc, the adjustment value C (C<0) is calculated in such a way as to reduce hysteresis.

$$c > Thc$$

Meanwhile, in a case where the above expression does not hold in step S102c, the adjustment value C calculation process of step S103c is omitted, and the process proceeds to step S104.

In this case, the adjustment value C is set such that the adjustment value C=0.

That is, the zoom change rate corresponding adjustment value C is calculated such that hysteresis is reduced in a case where the zoom change rate c is larger than the threshold Thc and that the amount of hysteresis is not changed in other cases.

This process corresponds to the following process. In a case where a zoom change rate is large, an image shake associated with the switching of reference images is less likely to be noticed. Thus, hysteresis is reduced so that the occurrence of the switching of reference images is not excessively reduced. Meanwhile, in a case where the zoom change rate is small, an image shake associated with the switching of reference images is likely to be noticed. Thus, hysteresis is not reduced, so that the occurrence of the switching of reference images can be reduced.

In step S102d, the illuminance change rate d detected by the illuminance change rate detection unit (illuminance sensor or the like) 204 is compared with the threshold Thd.

$$d > Thd$$

In a case where the above expression holds, the hysteresis adjustment value D is calculated (obtained from the storage unit 152) in step S103d.

Note that the hysteresis adjustment value D is a value of 0 or less.

That is, in a case where the illuminance change rate d is larger than the threshold Thd, the adjustment value D (D<0) is calculated in such a way as to reduce hysteresis.

$$d > Thd$$

Meanwhile, in a case where the above expression does not hold in step S102d, the adjustment value D calculation process of step S103d is omitted, and the process proceeds to step S104.

In this case, the adjustment value D is set such that the adjustment value D=0.

That is, the illuminance change rate corresponding adjustment value D is calculated such that hysteresis is reduced in a case where the illuminance change rate d is larger than the threshold Thd and that the amount of hysteresis is not changed in other cases.

This process corresponds to the following process. In a case where the change rate of illuminance is large, an image shake associated with the switching of reference images is less likely to be noticed. Thus, hysteresis is reduced so that the occurrence of the switching of reference images is not excessively reduced. Meanwhile, in a case where the change rate of illuminance is small, an image shake associated with the switching of reference images is likely to be noticed. Thus, hysteresis is not reduced, so that the occurrence of the switching of reference images can be reduced.

In step S102e, the ISO sensitivity change rate e acquired by the ISO sensitivity change rate acquisition unit 205 is compared with the threshold The.

$$e > The$$

In a case where the above expression holds, the hysteresis adjustment value E is calculated (obtained from the storage unit 152) in step S103e.

Note that the hysteresis adjustment value E is a value of 0 or less.

That is, in a case where the ISO sensitivity change rate e is larger than the threshold The, the adjustment value E (E<0) is calculated in such a way as to reduce hysteresis.

$$e > The$$

Meanwhile, in a case where the above expression does not hold in step S102e, the adjustment value E calculation process of step S103e is omitted, and the process proceeds to step S104.

In this case, the adjustment value E is set such that the adjustment value E=0.

That is, the ISO sensitivity change rate corresponding adjustment value E is calculated such that hysteresis is reduced in a case where the ISO sensitivity change rate e is larger than the threshold The and that the amount of hysteresis is not changed in other cases.

This process corresponds to the following process. In a case where the change rate of ISO sensitivity is large, an image shake associated with the switching of reference images is less likely to be noticed. Thus, hysteresis is reduced so that the occurrence of the switching of reference images is not excessively reduced. Meanwhile, in a case where the change rate of ISO sensitivity is small, an image shake associated with the switching of reference images is likely to be noticed. Thus, hysteresis is not reduced, so that the occurrence of the switching of reference images can be reduced.

In step S102f, the scene change determination index value f input from the scene determination unit 206 is compared with the threshold Thf.

$$f > Thf$$

In a case where the above expression holds, the hysteresis adjustment value F is calculated (obtained from the storage unit 152) in step S103f.

Note that the hysteresis adjustment value F is a value of 0 or less.

That is, in a case where the scene change determination index value f is larger than the threshold Thf, the adjustment value F (F<0) is calculated in such a way as to reduce hysteresis.

$$f > Thf$$

Meanwhile, in a case where the above expression does not hold in step S102*f*, the adjustment value F calculation process of step S103*f* is omitted, and the process proceeds to step S104.

In this case, the adjustment value F is set such that the adjustment value F=0.

That is, the scene change determination index value corresponding adjustment value F is calculated such that hysteresis is reduced in a case where the scene change determination index value f is larger than the threshold Thf and that the amount of hysteresis is not changed in other cases.

This process corresponds to the following process. In a case where there is a large scene change, an image shake associated with the switching of reference images is less likely to be noticed. Thus, hysteresis is reduced so that the occurrence of the switching of reference images is not excessively reduced. Meanwhile, in a case where there is a small scene change, an image shake associated with the switching of reference images is likely to be noticed. Thus, hysteresis is not reduced, so that the occurrence of the switching of reference images can be reduced.

In step S102*g*, the white balance change rate g input from the white balance change rate acquisition unit 207 is compared with the threshold Thg.

$$g > Thg$$

In a case where the above expression holds, the hysteresis adjustment value G is calculated (obtained from the storage unit 152) in step S103*g*.

Note that the hysteresis adjustment value G is a value of 0 or less.

That is, in a case where the white balance change rate g is larger than the threshold Thg, the adjustment value G (G<0) is calculated in such a way as to reduce hysteresis.

$$g > Thg$$

Meanwhile, in a case where the above expression does not hold in step S102*g*, the adjustment value G calculation process of step S103*g* is omitted, and the process proceeds to step S104.

In this case, the adjustment value G is set such that the adjustment value G=0.

That is, the white balance change rate corresponding adjustment value G is calculated such that hysteresis is reduced in a case where the white balance change rate g is larger than the threshold Thg and that the amount of hysteresis is not changed in other cases.

This process corresponds to the following process. In a case where the white balance change rate is large, an image shake associated with the switching of reference images is less likely to be noticed. Thus, hysteresis is reduced so that the occurrence of the switching of reference images is not excessively reduced. Meanwhile, in a case where the white balance change rate is small, an image shake associated with the switching of reference images is likely to be noticed. Thus, hysteresis is not reduced, so that the occurrence of the switching of reference images can be reduced.

In step S102*h*, the intra-image face area occupancy rate h input from the face detection unit 208 is compared with the threshold Thh.

$$h > Thh$$

In a case where the above expression holds, the hysteresis adjustment value H is calculated (obtained from the storage unit 152) in step S103*h*.

Note that the hysteresis adjustment value H is a value of 0 or more.

That is, in a case where the intra-image face area occupancy rate h is larger than the threshold Thh, the adjustment value H (H>0) is calculated in such a way as to increase hysteresis.

$$h > Thh$$

Meanwhile, in a case where the above expression does not hold in step S102*h*, the adjustment value H calculation process of step S103*h* is omitted, and the process proceeds to step S104.

In this case, the adjustment value H is set such that the adjustment value H=0.

That is, the intra-image face area occupancy rate corresponding adjustment value H is calculated such that the hysteresis is increased in a case where the intra-image face area occupancy rate h is larger than the threshold Thh and that the amount of hysteresis is not changed in other cases.

This process corresponds to the following process. In a case where the intra-image face area occupancy rate is large, the image is noticeable and an image shake associated with the switching of reference images is likely to be noticed. Thus, hysteresis is increased so that the occurrence of the switching of reference images is reduced. Meanwhile, in a case where the intra-image face area occupancy rate is small, the image is not noticeable and an image shake associated with the switching of reference images is less likely to be noticed. Thus, hysteresis is reduced so that the occurrence of the switching of reference images is not excessively reduced.

(Step S104)

When the processes of steps S103*a* to *h* are completed and calculation of the hysteresis adjustment values A to H is completed, the hysteresis calculation unit 151 calculates a hysteresis overall adjustment value in step S104.

The hysteresis overall adjustment value is the sum of the hysteresis adjustment values A to H. That is, the hysteresis calculation unit 151 calculates the sum of the following hysteresis adjustment values A to H:

the motion vector quantity corresponding adjustment value A, the camera motion quantity corresponding adjustment value B, the zoom change rate corresponding adjustment value C, the illuminance change rate corresponding adjustment value D, the ISO sensitivity change rate corresponding adjustment value E, the scene change determination index value corresponding adjustment value F, the white balance change rate corresponding adjustment value G, and the intra-image face area occupancy rate corresponding adjustment value H.

That is, the above-described hysteresis overall adjustment value is calculated as follows:

$$\text{hysteresis overall adjustment value} = A+B+C+D+E+F+G+H.$$

Note that the values A to G are equal to or lower than 0 and serve as adjustment values for reducing hysteresis, and only the value H is equal to or larger than 0 and serves as an adjustment value for increasing hysteresis, as described above.

(Step S105)

Next, in step S105, the hysteresis calculation unit 151 confirms whether or not a hysteresis to be finally applied, that is, a hysteresis calculated as follows is equal to or larger than 0:

(reference hysteresis)+(hysteresis overall adjustment value).

The reference hysteresis refers to a default hysteresis subjected to no hysteresis adjustment. This value is stored in the storage unit 152.

(Reference hysteresis)+(Hysteresis overall adjustment value)

When the calculated hysteresis becomes less than 0, the calculated hysteresis cannot be applied.

In this case, the process proceeds to step S107, and the process is performed on the assumption that hysteresis=0.

(Reference hysteresis)+(Hysteresis overall adjustment value)

In a case where it is confirmed that the calculated hysteresis is equal to or larger than 0, the process proceeds to step S106.

(Step S106)

In step S106, the hysteresis calculation unit 151 calculates the hysteresis to be finally applied, that is, a hysteresis defined as follows:

hysteresis=(reference hysteresis)+(hysteresis overall adjustment value).

That is, the hysteresis is calculated as follows:

hysteresis=(reference hysteresis)+($A+B+C+D+E+F+G+H$).

The hysteresis calculated here is output to the reference image selection unit 153 of the reference image determination unit 124 shown in FIG. 12.

Note that A to G≤0 and H≥0.

The reference image selection unit 153 performs the reference image switching process by applying the hysteresis calculated by the hysteresis calculation unit 151, that is, the hysteresis calculated as represented by the following equation:

hysteresis=(reference hysteresis)+($A+B+C+D+E+F+G+H$).

The reference image switching process is the process described above with reference to, for example, FIGS. 13, 14A, 14B, 15A, and 15B.

As described above, the image processing apparatus according to the present disclosure changes a hysteresis to be applied to the reference image switching process by using each of the following adjustment values:

the motion vector quantity corresponding adjustment value A, the camera motion quantity corresponding adjustment value B, the zoom change rate corresponding adjustment value C, the illuminance change rate corresponding adjustment value D, the ISO sensitivity change rate corresponding adjustment value E, the scene change determination index value corresponding adjustment value F, the white balance change rate corresponding adjustment value G, and the intra-image face area occupancy rate corresponding adjustment value H.

Examples of hysteresis adjustment based on the respective adjustment values will be described together, with reference to FIG. 20. As shown in FIG. 20, examples of the hysteresis control parameter include the following parameters:

(1) an intra-screen motion vector quantity,
(2) a camera motion quantity,
(3) a zoom change rate,
(4) an illuminance change rate,
(5) an ISO sensitivity change rate,
(6) a scene change determination index value,
(7) a white balance change rate,
(8) an intra-image face area occupancy rate, and
(9) a reference image change reduction mode setting value (ON/OFF).

Among the parameters described above, the parameters (1) to (8) respectively correspond to the detection information from the intra-screen motion vector calculation unit 201, the camera motion detection unit (gyro sensor or the like) 202, the zoom change rate detection unit 203, the illuminance change rate detection unit (illuminance sensor or the like) 204, the ISO sensitivity change rate acquisition unit 205, the scene determination unit 206, the white balance change rate acquisition unit 207, and the face detection unit 208 shown in the configuration diagram of FIG. 12. The parameters (1) to (8) are applied to the processing described with reference to the flows shown in FIGS. 17 to 19.

The parameter (9) "reference image change reduction mode setting value (ON/OFF)" is a parameter to be set by a user, and is a parameter that can be set via, for example, the operation unit.

When the user sets the reference image change reduction mode setting value to ON, hysteresis can be reduced.

The other parameters will be described.

The parameter (1) "intra-screen motion vector quantity" is the motion vector quantity a calculated by the intra-screen motion vector calculation unit 201, and serves as a hysteresis control parameter set such that hysteresis is reduced in a case where the motion vector quantity a detected from a color image or a black-and-white image is larger than the threshold Tha and that the amount of hysteresis is not changed in other cases.

The parameter (2) "camera motion quantity" is the camera motion quantity b detected by the camera motion detection unit (gyro sensor or the like) 202 of the camera that has captured a color image or a black-and-white image, and serves as a hysteresis control parameter set such that hysteresis is reduced in a case where the camera motion quantity b is larger than the threshold Thb and that the amount of hysteresis is not changed in other cases.

The parameter (3) "zoom change rate" is the zoom change rate c detected by the zoom change rate acquisition unit 203, and serves as a hysteresis control parameter set such that hysteresis is reduced in a case where the zoom change rate c of the camera that has captured a color image or a black-and-white image is larger than the threshold Thc and that the amount of hysteresis is not changed in other cases.

The parameter (4) "illuminance change rate" is the illuminance change rate d detected by the illuminance change rate detection unit (illuminance sensor or the like) 204, and serves as a hysteresis control parameter set such that hysteresis is reduced in a case where the illuminance change rate d observed at the time of capturing a color image or a black-and-white image is larger than the threshold Thd and that the amount of hysteresis is not changed in other cases.

The parameter (5) "ISO sensitivity change rate" is the ISO sensitivity change rate e acquired by the ISO sensitivity change rate acquisition unit 205, and serves as a hysteresis control parameter set such that hysteresis is reduced in a case where the ISO sensitivity change rate e observed at the time of capturing a color image or a black-and-white image is larger than the threshold The and that the amount of hysteresis is not changed in other cases.

The parameter (6) "scene change determination index value" is the scene change determination index value f calculated by the scene determination unit 206, and serves as a hysteresis control parameter set such that hysteresis is reduced in a case where the scene change determination index value f of a color image or a black-and-white image is larger than the threshold Thf and that the amount of hysteresis is not changed in other cases.

Note that the scene change determination index value f is an index value that increases as a scene change rate increases.

The parameter (7) "white balance change rate" is the white balance change rate g input from the white balance change rate acquisition unit 207, and serves as a hysteresis control parameter set such that hysteresis is reduced in a case where the white balance change rate g of a color image is larger than the threshold Thg and that the amount of hysteresis is not changed in other cases.

The parameter (8) "intra-image face area occupancy rate" is the intra-image face area occupancy rate h input from the face detection unit 208, and serves as a hysteresis control parameter set such that hysteresis is increased in a case where the intra-image face area occupancy rate h of a color image or a black-and-white image is larger than the threshold Thh and that the amount of hysteresis is not changed in other cases.

As described above, the image processing apparatus according to the present disclosure adjusts the hysteresis to be applied to the reference image switching process by using various hysteresis control parameters.

This adjustment process enables reduction of the switching of reference images at an image frame position where an image shake is likely to be noticed by an observer.

5. Regarding User-Settable Parameters

Next, user-settable parameters will be described with reference to FIG. 21 and subsequent drawings.

As shown in FIG. 21, the user-settable parameters include the following.

(1) reference threshold
(2) reference hysteresis
(3) hysteresis adjustment value corresponding to each hysteresis control parameter
(4) threshold corresponding to each hysteresis control parameter
(5) application range corresponding to each hysteresis control parameter The parameters (1) "reference threshold" include the occlusion square measure threshold Thx and the parallax threshold Thy described above with reference to FIG. 8, and are stored in the storage unit 152.

The user can change these setting values via, for example, the operation unit or the touch panel.

The parameter (2) "reference hysteresis" is the predetermined default hysteresis described above with reference to FIGS. 13, 14A, 14B, 15A, and 15B, and is stored in the storage unit 152.

The user can change the setting value of the reference hysteresis via the operation unit or the touch panel.

The parameters (3) "hysteresis adjustment value corresponding to each hysteresis control parameter" include the following adjustment values described above with reference to the flowcharts of FIGS. 17 to 19:

the motion vector quantity corresponding adjustment value A,
the camera motion quantity corresponding adjustment value B,
the zoom change rate corresponding adjustment value C,
the illuminance change rate corresponding adjustment value D,
the ISO sensitivity change rate corresponding adjustment value E,
the scene change determination index value corresponding adjustment value F,
the white balance change rate corresponding adjustment value G, and
the intra-image face area occupancy rate corresponding adjustment value H.

These adjustment values A to H are stored in the storage unit 152.

The user can change the setting values of the adjustment values A to H via the operation unit or the touch panel.

Furthermore, these adjustment values A to H may be, for example, calculated by use of predetermined functions, instead of being set as fixed values.

For example, a function f may be used to calculate the motion vector quantity corresponding adjustment value A such that the motion vector quantity a is input to the function f to calculate the motion vector quantity corresponding adjustment value A as follows:

$$\text{motion vector quantity corresponding adjustment value } A = f(a).$$

The user can set the functions for calculating the adjustment values A to H via an operation unit 300 shown in FIG. 22.

The parameters (4) "threshold corresponding to each hysteresis control parameter" include the thresholds Tha to Thh described above with reference to the flowcharts of FIGS. 17 to 19, and are stored in the storage unit 152.

The user can change these setting values via the operation unit or the touch panel.

User setting examples of the parameter (5) "application range corresponding to each hysteresis control parameter" include the setting of a range of detecting an intra-image motion vector. Specifically, it is possible to perform the process of, for example, setting a motion vector detection range in the entire screen, only in the center of the screen, or only in a face area detection range, or setting a weight on each area.

The user can change the application range corresponding to each hysteresis control parameter via the operation unit or the touch panel.

6. Regarding Other Embodiments

The example of the composite image generation process based on the combination of a color image and a black-and-white image has been described in the embodiment above. However, the process of the present disclosure is not limited to the combination of these two types of images, and is also applicable to a combination of other types of images.

For example, the process of the present disclosure can also be applied with the following settings.

(1) A configuration in which two color images captured by two color image capturing units are combined to generate a single composite color image.

(2) A configuration in which two black-and-white images captured by two black-and-white image capturing units are combined to generate a single composite black-and-white image.

(3) Generation of a composite image in which a color or black-and-white image and an infrared light image are combined.

(4) Generation of a composite image in which a color or black-and-white image and a range image are combined.

The process of the present disclosure can also be applied to generation of these various composite images.

Moreover, the following configurations can also be adopted as hysteresis control configurations for dealing with the switching of reference images.

Hysteresis is increased by a user operation (depression or the like on the operation unit) only for a previously specified time, so that the switching of reference images is reduced.

However, in this case, a configuration may be adopted in which reference images are switched in a case where it is determined that a significant deterioration is found in the image quality of a composite image.

Furthermore, after the elapse of the specified time, the original hysteresis setting is restored.

Moreover, the specified time can be set by the user.

Furthermore, in the above-described embodiment, the reference image determination unit 124 has been described as being configured to control the switching of the following two composite images:

(1) a composite image with a color image used as a reference image, and (2) a composite image with a black-and-white image used as a reference image.

However, the reference image determination unit 124 may be configured to perform, for example, the following processing.

The reference image determination unit 124 may be configured to output, for example, any of the following four types of images on the basis of the detection information from the intra-screen motion vector calculation unit 201 to the face detection unit 208, image quality information, or user settings:

(1) a composite image with a color image used as a reference image, (2) a composite image with a black-and-white image used as a reference image, (3) a color image subjected to no composition processing, or (4) a black-and-white image subjected to no composition processing.

7. Summary of Configurations of Present Disclosure

The embodiments of the present disclosure have been described above in detail with reference to specific examples. However, it is obvious that those skilled in the art can make modifications and substitutions of the embodiments without departing from the gist of the present disclosure. In other words, the present invention has been disclosed in the form of exemplification, and should not be restrictively interpreted. In order to judge the gist of the present disclosure, the section "CLAIMS" should be taken into consideration.

Note that the technology disclosed in the present specification can adopt the following configurations.

(1) An image processing apparatus including:

an image processing unit that performs a process of combining a color image and a black-and-white image captured from different viewpoints to generate a composite image, the image processing unit being configured to generate either of the following two types of composite images (a) and (b) by switching between the two types of composite images on the basis of a predetermined reference image switching threshold:

(a) a color image-based composite image in which a position of the black-and-white image is adjusted to coincide with a position of the color image, or (b) a black-and-white image-based composite image in which the position of the color image is adjusted to coincide with the position of the black-and-white image; and a reference image determination unit that performs a reference image determination process in which it is determined whether to use the color image or the black-and-white image as a reference image, the reference image determination unit being configured to set a hysteresis as the reference image switching threshold and perform control to change the hysteresis according to a situation.

(2) The image processing apparatus according to (1), in which the reference image switching threshold is a threshold determined on the basis of image qualities of the color image-based composite image and the black-and-white image-based composite image.

(3) The image processing apparatus according to (1) or (2), in which the reference image switching threshold is a threshold determined on the basis of at least either of a parallax between the color image and the black-and-white image or occlusion square measure.

(4) The image processing apparatus according to any one of (1) to (3), in which the image processing unit performs an analysis process for each of the color image and the black-and-white image in units of divided areas when the reference image is determined.

(5) The image processing apparatus according to any one of (1) to (4), in which the reference image determination unit includes:

a hysteresis calculation unit that performs control to change a hysteresis according to a situation; and a reference image selection unit that switches reference images by applying a hysteresis calculated by the hysteresis calculation unit.

(6) The image processing apparatus according to any one of (1) to (5), in which the reference image determination unit performs control to reduce the hysteresis in a case where motion vector quantities detected from the color image and the black-and-white image are larger than a specified threshold.

(7) The image processing apparatus according to any one of (1) to (6), in which the reference image determination unit performs control to reduce the hysteresis in a case where a motion quantity of a camera that has captured the color image and the black-and-white image is larger than a specified threshold.

(8) The image processing apparatus according to any one of (1) to (7), in which the reference image determination unit performs control to reduce the hysteresis in a case where a zoom change rate of a camera that has captured the color image and the black-and-white image is larger than a specified threshold.

(9) The image processing apparatus according to any one of (1) to (8), in which
the reference image determination unit performs control to reduce the hysteresis in a case where illuminance change rates observed when the color image and the black-and-white image are captured are larger than a specified threshold.

(10) The image processing apparatus according to any one of (1) to (9), in which
the reference image determination unit performs control to reduce the hysteresis in a case where ISO sensitivity change rates observed when the color image and the black-and-white image are captured are larger than a specified threshold.

(11) The image processing apparatus according to any one of (1) to (10), in which
the reference image determination unit performs control to reduce the hysteresis in a case where scene change determination index values of the color image and the black-and-white image are larger than a specified threshold.

(12) The image processing apparatus according to any one of (1) to (11), in which
the reference image determination unit performs control to reduce the hysteresis in a case where a white balance change rate of the color image is larger than a specified threshold.

(13) The image processing apparatus according to any one of (1) to (12), in which
the reference image determination unit performs control to increase the hysteresis in a case where a face area occupancy rate of the color image or the black-and-white image is larger than a specified threshold.

(14) The image processing apparatus according to any one of (1) to (13), in which
the reference image determination unit continuously performs control to change the hysteresis while a moving image is being captured.

(15) An image processing apparatus including:
an image processing unit that performs a process of combining a first image and a second image captured from different viewpoints to generate a composite image, the image processing unit being configured to generate either of the following two types of composite images (a) and (b) by switching between the two types of composite images on the basis of a predetermined reference image switching threshold:
(a) a first image-based composite image in which a position of the second image is adjusted to coincide with a position of the first image, or
(b) a second image-based composite image in which the position of the first image is adjusted to coincide with the position of the second image; and
a reference image determination unit that performs a reference image determination process in which it is determined whether to use the first image or the second image as a reference image, the reference image determination unit being configured to set a hysteresis as the reference image switching threshold and perform control to change the hysteresis according to a situation.

(16) An image processing method to be performed in an image processing apparatus configured to perform a process of combining a color image and a black-and-white image captured from different viewpoints and generate either of the following two types of composite images (a) and (b) by switching between the two types of composite images on the basis of a predetermined reference image switching threshold:
(a) a color image-based composite image in which a position of the black-and-white image is adjusted to coincide with a position of the color image, or
(b) a black-and-white image-based composite image in which the position of the color image is adjusted to coincide with the position of the black-and-white image, the method including:
causing a reference image determination unit of the image processing apparatus to perform a reference image determination process in which it is determined whether to use the color image or the black-and-white image as a reference image; and
causing the reference image determination unit to set a hysteresis as the reference image switching threshold and perform control to change the hysteresis according to a situation.

(17) An image processing method to be performed in an image processing apparatus configured to perform a process of combining a first image and a second image captured from different viewpoints and generate either of the following two types of composite images (a) and (b) by switching between the two types of composite images on the basis of a predetermined reference image switching threshold:
(a) a first image-based composite image in which a position of the second image is adjusted to coincide with a position of the first image, or
(b) a second image-based composite image in which the position of the first image is adjusted to coincide with the position of the second image, the method including:
causing a reference image determination unit of the image processing apparatus to perform a reference image determination process in which it is determined whether to use the first image or the second image as a reference image; and
causing the reference image determination unit to set a hysteresis as the reference image switching threshold and perform control to change the hysteresis according to a situation.

(18) A program for causing image processing to be performed in an image processing apparatus configured to perform a process of combining a color image and a black-and-white image captured from different viewpoints and generate either of the following two types of composite images (a) and (b) by switching between the two types of composite images on the basis of a predetermined reference image switching threshold:
(a) a color image-based composite image in which a position of the black-and-white image is adjusted to coincide with a position of the color image, or
(b) a black-and-white image-based composite image in which the position of the color image is adjusted to coincide with the position of the black-and-white image, the program causing a reference image determination unit of the image processing apparatus to:
perform a reference image determination process in which it is determined whether to use the color image or the black-and-white image as a reference image; and
set a hysteresis as the reference image switching threshold and perform control to change the hysteresis according to a situation in the reference image determination process.

Furthermore, the series of processes described in the specification can be implemented by hardware, software, or a configuration in which hardware and software are combined. In a case where the processes are implemented by software, it is possible to execute a program in which a process sequence has been recorded, after installing the program in a memory in a computer incorporated in dedicated hardware or installing the program on a general-purpose computer capable of performing various types of processing. For example, the program can be recorded in advance on a recording medium. In addition to being installed on a computer from the recording medium, the program can be received via a network such as a local area network (LAN) or the Internet and installed on a recording medium such as a built-in hard disk.

Note that the various processes described in the specification may be performed not only in time series according to the description, but also in parallel or separately depending on the processing capacity of an apparatus that performs the processes or depending on the needs. Furthermore, in the present specification, the term "system" refers to a logical set configuration of a plurality of devices, and is not limited to one in which the devices of each configuration are in the same casing.

INDUSTRIAL APPLICABILITY

As described above, according to the configuration of one embodiment of the present disclosure, there are achieved an apparatus and a method for switching a color image-based composite image and a black-and-white image-based composite image at an optimum timing such that it is difficult for an observer to notice the switching of the images.

Specifically, for example, a color image and a black-and-white image captured from different viewpoints are input to generate either of the following two types of composite images of (a) a color image-based composite image in which a position of the black-and-white image is adjusted to coincide with a position of the color image and (b) a black-and-white image-based composite image in which the position of the color image is adjusted to coincide with the position of the black-and-white image, by switching between the two types of composite images on the basis of a predetermined reference image switching threshold. In this configuration, a hysteresis is set as the reference image switching threshold, and the hysteresis is changed according to a situation. Thus, reference images can be switched at an optimum timing such that it is difficult for an observer to notice the switching of the reference images.

With the present configuration, there are achieved an apparatus and a method for switching a color image-based composite image and a black-and-white image-based composite image at an optimum timing such that it is difficult for an observer to notice the switching of the images.

REFERENCE SIGNS LIST

10 Image processing apparatus
11 Display unit
12 Operation unit
21 Color image capturing unit
22 Black-and-white image capturing unit
100 Image processing apparatus
110 Imaging unit
111 Color image capturing unit
112 Black-and-white image capturing unit
120 Image processing unit
121, 122 Preprocessing unit
123 Parallax & occlusion detection unit
124 Reference image determination unit
125 Image composition unit
130 Output unit
131 Display unit
132 Storage unit
141 Sensor unit
142 Operation unit
150 Control unit
160 Communication unit
201 Intra-screen motion vector calculation unit
202 Camera motion detection unit (gyro sensor or the like)
203 Zoom change rate detection unit
204 Illuminance change rate detection unit (illuminance sensor or the like)
205 ISO sensitivity change rate acquisition unit
206 Scene determination unit
207 White balance change rate acquisition unit
208 Face detection unit

The invention claimed is:

1. An image processing apparatus, comprising:
an image processing unit configured to perform a process of combining a color image and a black-and-white image captured from different viewpoints to generate a composite image, the image processing unit is further configured to generate either of following two types of composite images (a) and (b) by switching between the two types of composite images on a basis of a predetermined reference image switching threshold:
(a) a color image-based composite image in which a position of the black-and-white image is adjusted to coincide with a position of the color image, or
(b) a black-and-white image-based composite image in which the position of the color image is adjusted to coincide with the position of the black-and-white image; and
a reference image determination unit configured to perform a reference image determination process in which it is determined whether to use the color image or the black-and-white image as a reference image, the reference image determination unit is further configured to set a hysteresis as the predetermined reference image switching threshold and perform control to change the hysteresis according to a situation.

2. The image processing apparatus according to claim 1, wherein
the predetermined reference image switching threshold is a threshold determined on a basis of image qualities of the color image-based composite image and the black-and-white image-based composite image.

3. The image processing apparatus according to claim 1, wherein
the predetermined reference image switching threshold is a threshold determined on a basis of at least either of a parallax between the color image and the black-and-white image or occlusion square measure.

4. The image processing apparatus according to claim 1, wherein
the image processing unit is further configured to perform an analysis process for each of the color image and the black-and-white image in units of divided areas when the reference image is determined.

5. The image processing apparatus according to claim 1, wherein
the reference image determination unit includes:
a hysteresis calculation unit is configured to perform control to change the hysteresis according to the situation; and
a reference image selection unit is configured to switch reference images by applying the hysteresis calculated by the hysteresis calculation unit.

6. The image processing apparatus according to claim 1, wherein
the reference image determination unit is further configured to perform control to reduce the hysteresis in a case where motion vector quantities detected from the color image and the black-and-white image are larger than a specified threshold.

7. The image processing apparatus according to claim 1, wherein
the reference image determination unit is further configured to perform control to reduce the hysteresis in a case where a motion quantity of a camera that has captured the color image and the black-and-white image is larger than a specified threshold.

8. The image processing apparatus according to claim 1, wherein
the reference image determination unit is further configured to perform control to reduce the hysteresis in a case where a zoom change rate of a camera that has captured the color image and the black-and-white image is larger than a specified threshold.

9. The image processing apparatus according to claim 1, wherein
the reference image determination unit is further configured to perform control to reduce the hysteresis in a case where illuminance change rates observed when the color image and the black-and-white image are captured are larger than a specified threshold.

10. The image processing apparatus according to claim 1, wherein
the reference image determination unit is further configured to perform control to reduce the hysteresis in a case where ISO sensitivity change rates observed when the color image and the black-and-white image are captured are larger than a specified threshold.

11. The image processing apparatus according to claim 1, wherein
the reference image determination unit is further configured to perform control to reduce the hysteresis in a case where scene change determination index values of the color image and the black-and-white image are larger than a specified threshold.

12. The image processing apparatus according to claim 1, wherein
the reference image determination unit is further configured to perform control to reduce the hysteresis in a case where a white balance change rate of the color image is larger than a specified threshold.

13. The image processing apparatus according to claim 1, wherein
the reference image determination unit is further configured to perform control to increase the hysteresis in a case where a face area occupancy rate of the color image or the black-and-white image is larger than a specified threshold.

14. The image processing apparatus according to claim 1, wherein
the reference image determination is further configured to continuously perform control to change the hysteresis while a moving image is being captured.

15. An image processing apparatus, comprising:
an image processing unit configured to perform a process of combining a first image and a second image captured from different viewpoints to generate a composite image, the image processing unit is further configured to generate either of following two types of composite images (a) and (b) by switching between the two types of composite images on a basis of a predetermined reference image switching threshold:
(a) a first image-based composite image in which a position of the second image is adjusted to coincide with a position of the first image, or
(b) a second image-based composite image in which the position of the first image is adjusted to coincide with the position of the second image; and
a reference image determination unit configured to perform a reference image determination process in which it is determined whether to use the first image or the second image as a reference image, the reference image determination unit is further configured to set a hysteresis as the predetermined reference image switching threshold and perform control to change the hysteresis according to a situation.

16. An image processing method to be performed in an image processing apparatus configured to perform a process of combining a color image and a black-and-white image captured from different viewpoints and generate either of following two types of composite images (a) and (b) by switching between the two types of composite images on a basis of a predetermined reference image switching threshold:
(a) a color image-based composite image in which a position of the black-and-white image is adjusted to coincide with a position of the color image, or
(b) a black-and-white image-based composite image in which the position of the color image is adjusted to coincide with the position of the black-and-white image, the method comprising:
causing a reference image determination unit of the image processing apparatus to perform a reference image determination process in which it is determined whether to use the color image or the black-and-white image as a reference image; and
causing the reference image determination unit to set a hysteresis as the predetermined reference image switching threshold and perform control to change the hysteresis according to a situation.

17. An image processing method to be performed in an image processing apparatus configured to perform a process of combining a first image and a second image captured from different viewpoints and generate either of following two types of composite images (a) and (b) by switching between the two types of composite images on a basis of a predetermined reference image switching threshold:
(a) a first image-based composite image in which a position of the second image is adjusted to coincide with a position of the first image, or
(b) a second image-based composite image in which the position of the first image is adjusted to coincide with the position of the second image, the method comprising:
causing a reference image determination unit of the image processing apparatus to perform a reference image determination process in which it is determined whether to use the first image or the second image as a reference image; and
causing the reference image determination unit to set a hysteresis as the predetermined reference image switching threshold and perform control to change the hysteresis according to a situation.

18. A program stored in a non-transitory computer readable medium for causing image processing to be performed in an image processing apparatus configured to perform a process of combining a color image and a black-and-white image captured from different viewpoints and generate either of following two types of composite images (a) and (b) by switching between the two types of composite images on a basis of a predetermined reference image switching threshold: (a) a color image-based composite image in which a position of the black-and-white image is adjusted to coincide with a position of the color image, or (b) a black-and-white image-based composite image in which the position of the color image is adjusted to coincide with the position of the black-and-white image, the program causing a reference image determination unit of the image processing apparatus to:

perform a reference image determination process in which it is determined whether to use the color image or the black-and-white image as a reference image; and set a hysteresis as the predetermined reference image switching threshold and perform control to change the hysteresis according to a situation in the reference image determination process.

* * * * *